United States Patent
Yasui et al.

(10) Patent No.: US 7,059,687 B2
(45) Date of Patent: Jun. 13, 2006

(54) BRAKING FORCE DISTRIBUTION CONTROL DEVICE

(75) Inventors: Yoshiyuki Yasui, Aichi-ken (JP);
 Tsuyoshi Yoshida, Aichi-ken (JP);
 Yutaka Ohnuma, Aichi-ken (JP);
 Akira Tanaka, Aichi-ken (JP); Masaru Sugai, Aichi-ken (JP); Eiichi Ono, Aichi-ken (JP); Mamoru Sawada, Mie-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 223 days.

(21) Appl. No.: 09/824,143

(22) Filed: Apr. 3, 2001

(65) Prior Publication Data

US 2002/0008423 A1  Jan. 24, 2002

(30) Foreign Application Priority Data

Apr. 3, 2000 (JP) ............................. 2000-101619
Apr. 5, 2000 (JP) ............................. 2000-103347

(51) Int. Cl.
 B60T 8/34 (2006.01)
(52) U.S. Cl. .................. 303/113.5; 303/149; 303/150; 303/9.62
(58) Field of Classification Search ............... 303/9.62, 303/149, 150, 186, 189, 113.5
 See application file for complete search history.

(56) References Cited

U.S. PATENT DOCUMENTS

| | | | |
|---|---|---|---|
| 4,836,618 A * | 6/1989 | Wakata et al. ............... | 303/160 |
| 6,027,182 A | 2/2000 | Nakanishi et al. | |
| 6,070,952 A | 6/2000 | Tozu et al. | |
| 6,122,585 A * | 9/2000 | Ono et al. .................. | 180/197 |
| 6,125,319 A | 9/2000 | Hac et al. | |
| 6,132,014 A | 10/2000 | Kiso et al. | |
| 6,182,001 B1 * | 1/2001 | Sugai et al. ................ | 303/122 |
| 6,203,121 B1 | 3/2001 | Kato et al. | |
| 6,266,600 B1 | 7/2001 | Miyazaki | |
| 6,266,602 B1 | 7/2001 | Yamaura | |
| 6,272,417 B1 | 8/2001 | Ross et al. | |
| 6,308,126 B1 | 10/2001 | Yokoyama et al. | |
| 6,324,461 B1 | 11/2001 | Yamaguchi et al. | |
| 6,377,885 B1 | 4/2002 | Yasui et al. | |
| 6,443,534 B1 | 9/2002 | Kamiya | |
| 6,485,111 B1 | 11/2002 | Suo et al. | |

FOREIGN PATENT DOCUMENTS

| | | |
|---|---|---|
| DE | 197 19 466 A1 | 12/1997 |
| DE | 197 37 779 A1 | 3/1999 |
| DE | 198 60 044 A1 | 7/1999 |
| DE | 199 36 786 A1 | 11/2000 |
| EP | 0825080 | * 2/1998 |
| EP | 0 887 241 | * 12/1998 |
| JP | 63-13851 | 1/1988 |
| JP | 4-22449 | 8/1992 |

(Continued)

*Primary Examiner*—James McClellan
*Assistant Examiner*—Bradley T. King
(74) *Attorney, Agent, or Firm*—Buchanan Ingersoll PC

(57) ABSTRACT

A braking force distribution control device is provided in which wheel speeds of respective wheels of a vehicle are detected. On the basis of the detected wheel speeds, slopes of coefficients of friction μ between the wheels and a road surface are estimated as road surface μ slope values of the respective wheels. On the basis of the estimated road surface μ slope values of the respective wheels, braking forces of the respective wheels are controlled such that the braking forces among the respective wheels are adjusted.

13 Claims, 21 Drawing Sheets

FOREIGN PATENT DOCUMENTS

| | | |
|---|---|---|
| JP | 4-224449 A | 8/1992 |
| JP | 5-278585 | 10/1993 |
| JP | 6-16117 | 1/1994 |
| JP | 6-179361 A | 6/1994 |
| JP | 7-165053 A | 6/1995 |
| JP | 8-324414 | 12/1996 |
| JP | 9-263233 A | 10/1997 |
| JP | 10-114263 | 5/1998 |
| JP | 10-273022 A | 10/1998 |
| JP | 2000-108863 * | 1/1999 |
| JP | 11-78843 | 3/1999 |
| JP | 11-91539 A | 4/1999 |
| JP | 11-263203 A | 9/1999 |
| JP | 11-321617 A | 11/1999 |
| JP | 11-334637 A | 12/1999 |
| JP | 2000-108863 A | 4/2000 |
| JP | 2000-118375 A | 4/2000 |

* cited by examiner

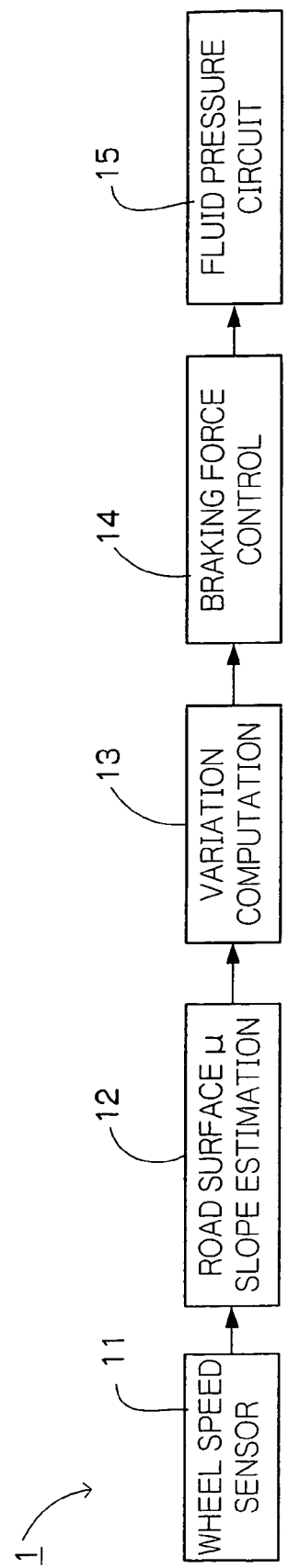
F I G . 1

F I G. 7
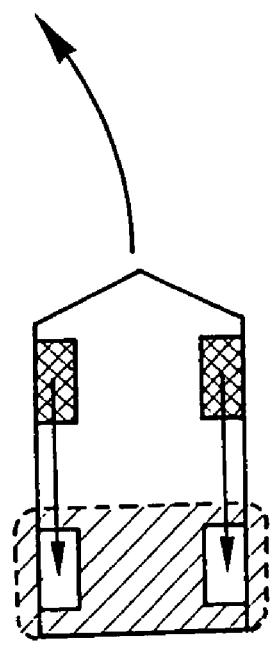
F I G. 8
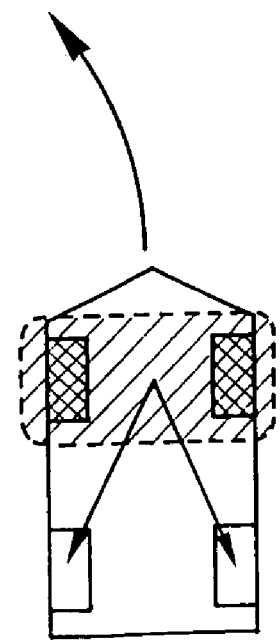

F I G. 9
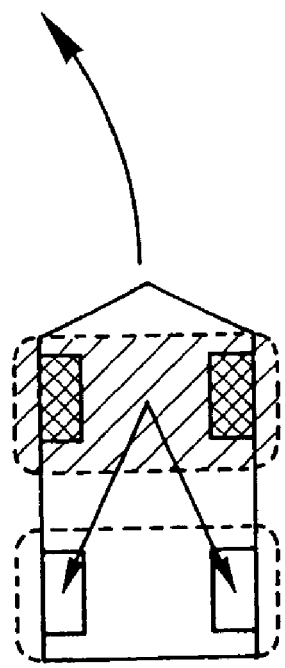
F I G. 1 0
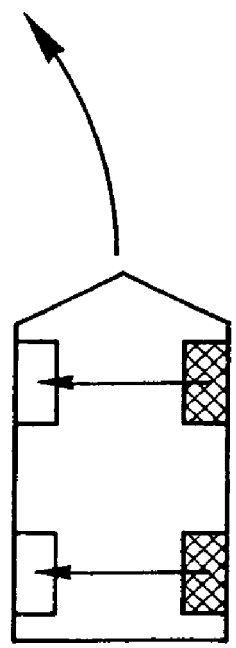

F I G. 1 1
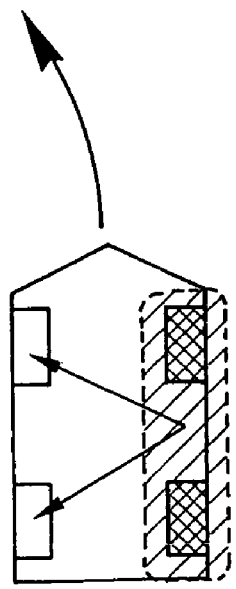
F I G. 1 2
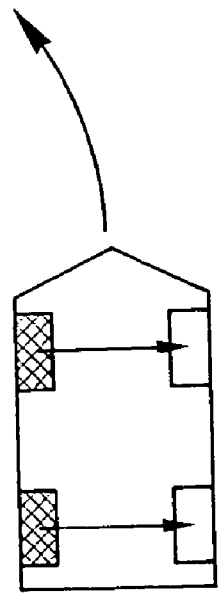

F I G. 1 3
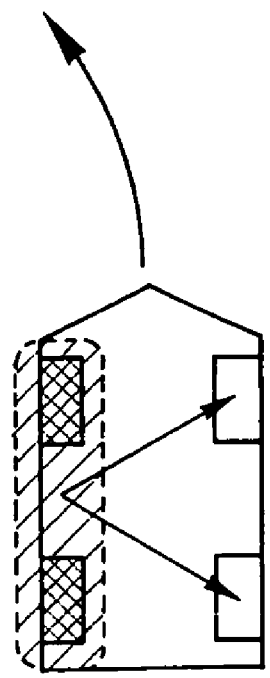
F I G. 1 4
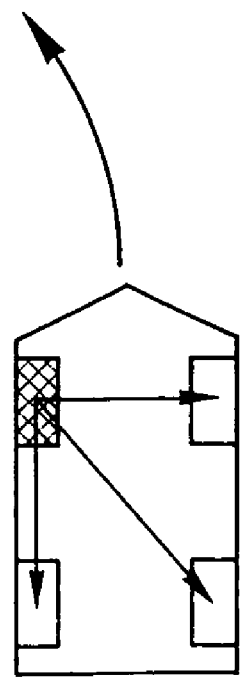

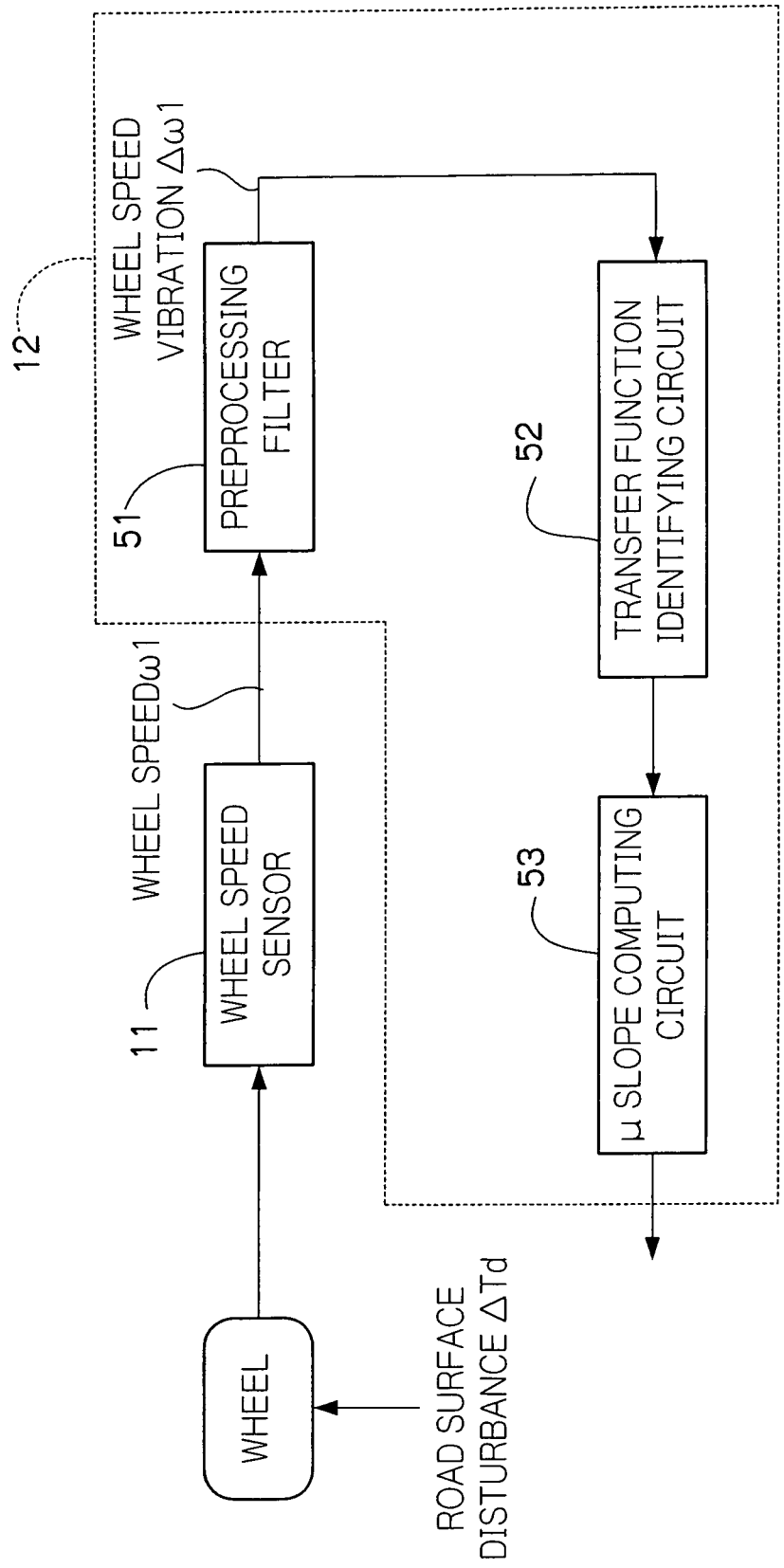

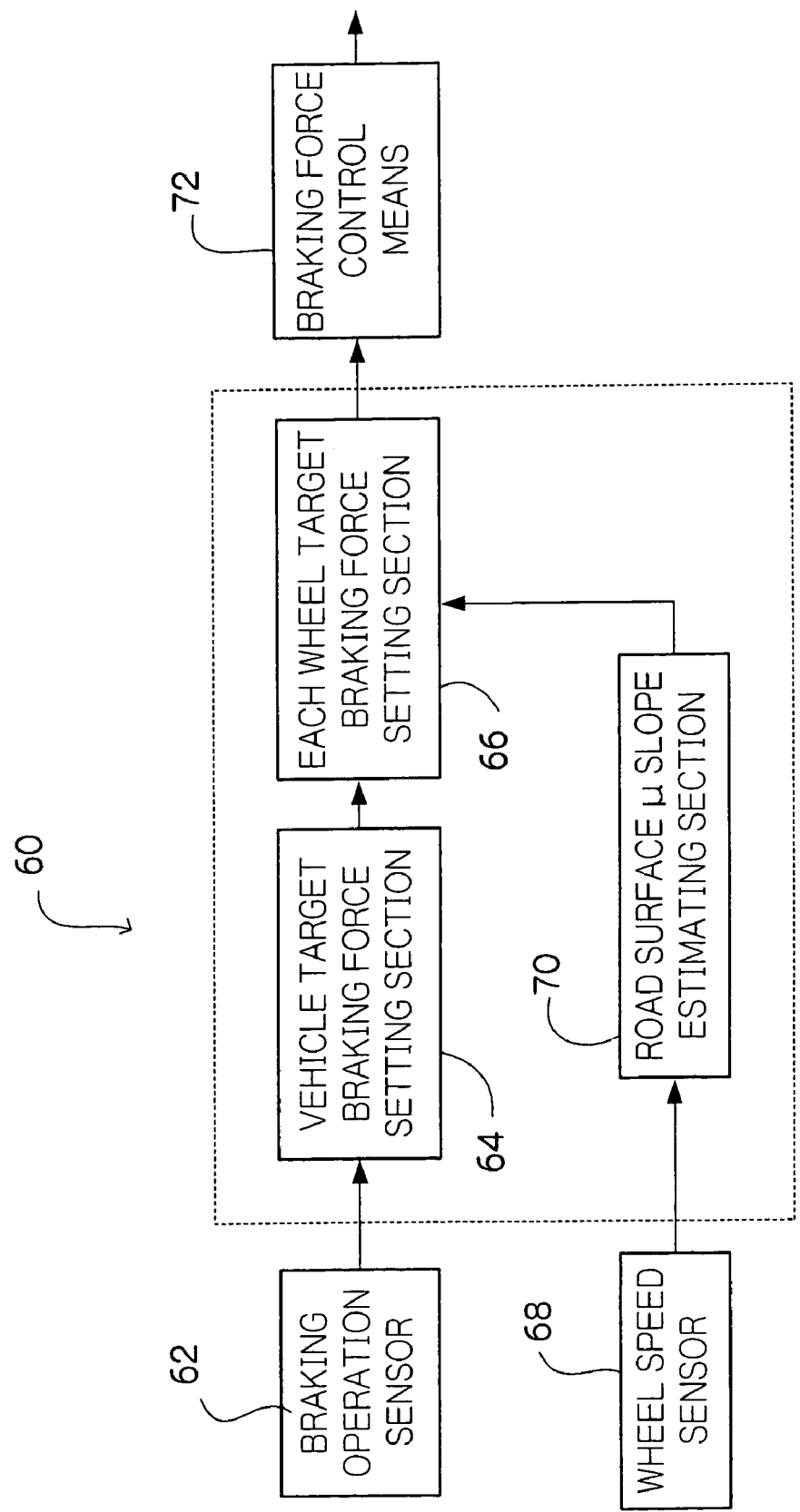
F I G. 2 0

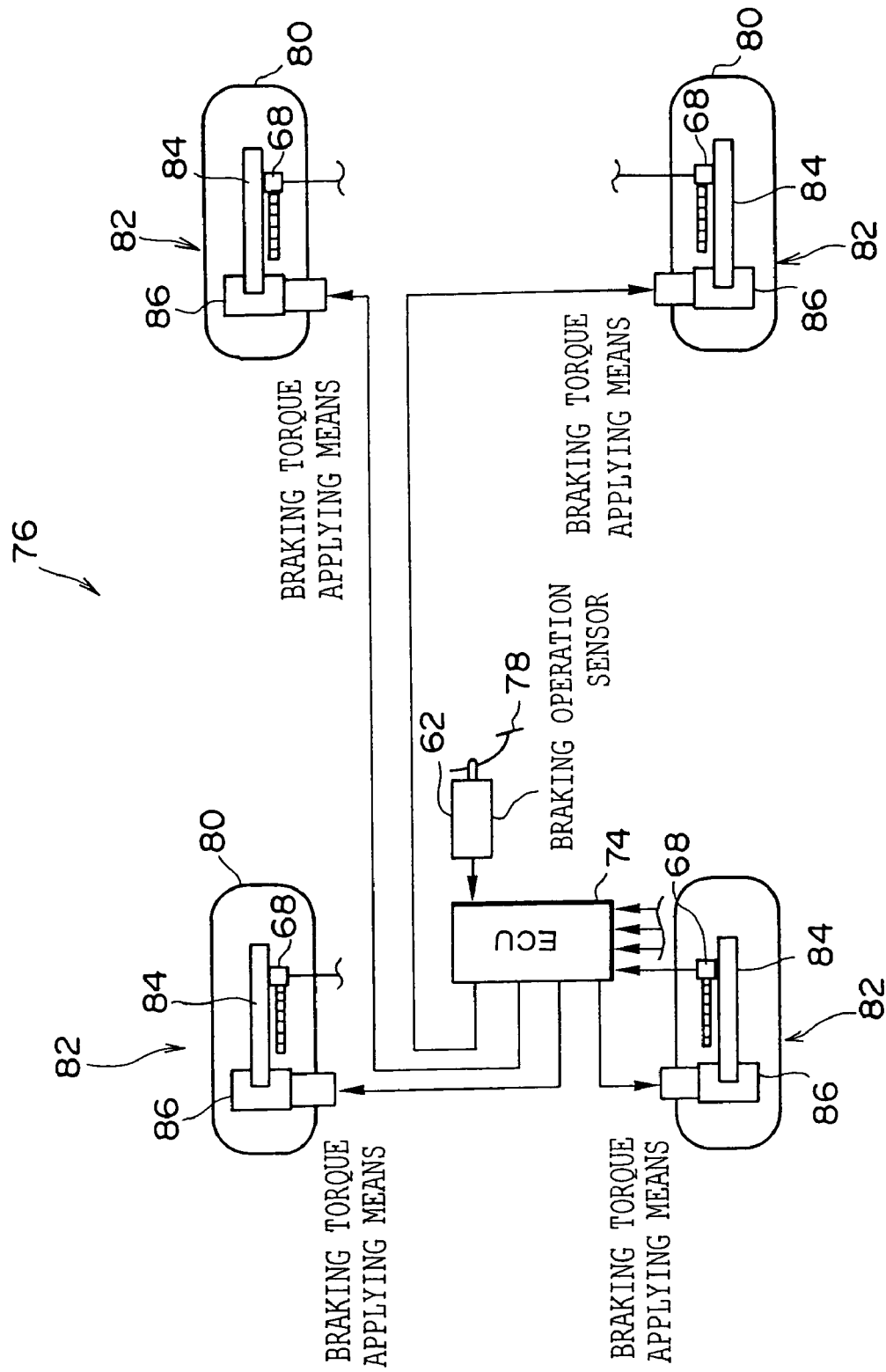

BRAKING FORCE DISTRIBUTION CONTROL DEVICE

BACKGROUND OF THE INVENTION

1. Field of the Invention

The present invention relates to a braking force distribution control device, and in particular, to a braking force distribution control device which is suitably used in braking control of a vehicle. The braking force distribution control device of the present invention can be used as a control torque control device for controlling braking torque, or as a braking force distribution control device for controlling the braking forces distributed to the respective wheels of a vehicle.

2. Description of the Related Art

In order to control the braking forces of the respective wheels of a vehicle, it is necessary to exhibit, to the maximum extent possible, the braking abilities of the respective wheels, while appropriately maintaining the posture (yaw motion) of the vehicle. However, considering braking during straight line traveling and braking during turning, the deceleration ability and the vehicle stability have an inverse relationship. Namely, although the deceleration ability is improved if the braking forces of the rear wheels are increased, conversely, the vehicle stability is sacrificed because the cornering forces of the rear wheels decrease.

In order to have a vehicle exhibit both of these contradictory properties, Japanese Patent Application Laid-Open (JP-A) No. 5-278585 discloses a device which controls the brake fluid pressures of the rearwheels on the basis of the wheel slip. Further, JP-A No. 63-13851 discloses a device for adjusting the left and right braking forces on the basis of the state of turning.

However, in these techniques, because the braking forces of the wheels are controlled without judging the grip forces of the tires at the time of braking, a problem arises in that, as the braking ability improves, the vehicle stability deteriorates. Further, although the braking force of each wheel differs in accordance with the traveling state of the vehicle, an equivalent braking torque is applied to each wheel in the aforementioned techniques. Thus, depending on the traveling state of the vehicle, the vehicle stability might deteriorate extremely.

Further, in order to exhibit, to the maximum extent possible, braking ability at each wheel while maintaining an appropriate posture of the vehicle, JP-A No. 6-16117 discloses a technique as follows. The sum total of the longitudinal force applied to the vehicle (the total longitudinal force) is detected or set, and an allotted load ratio of each wheel is determined. By distributing the total longitudinal force to the respective wheels in accordance with the allotted load ratios, target wheel longitudinal forces which are to be applied to the respective wheels are set, and the longitudinal forces of the respective wheels are controlled on the basis of these target wheel longitudinal forces.

Further, JP-A No. 4-224449 discloses a technique in which the brake fluid pressure is controlled such that values, which are obtained by dividing the braking forces of the front and rear wheels by the loads of the front and rear wheels respectively, are equal.

However, in this conventional technique, control of the braking force is not carried out in consideration of the frictional state between the road surface and the tire. For example, even if a wheel having a large load is on a low μ (friction) road, a problem arises in that an excessive braking force is distributed to that tire, such that there is the possibility that the tire may slip.

SUMMARY OF THE INVENTION

The present invention was developed in order to overcome the above-described drawbacks, and a first object of the present invention is to provide a braking force distribution control device which distributes braking forces to the respective wheels by controlling the braking force of each wheel.

Further, a second object of the present invention is to provide a braking force distribution control device which, by controlling the braking torque, can enable the vehicle to run stably even during braking, without depending on the traveling state of the vehicle.

A third object of the present invention is to provide a braking force distribution control device which enables optimal braking force distribution control to be carried out in consideration of not only the load of the wheel, but also the frictional state (road surface μ) between the road surface and the tire.

In order to achieve the above objects, the present invention is a braking force distribution control device comprising: wheel speed detecting means for detecting wheel speeds of respective wheels of a vehicle; road surface μ slope estimating means for, on the basis of the detected wheel speeds, estimating for the respective wheels slopes of a coefficient of friction μ between the wheels and a road surface as road surface μ slopes; and control means for, on the basis of the road surface μ slopes estimated for the respective wheels by the road surface μ slope estimating means, distributing braking forces to the respective wheels by controlling the braking force of each wheel.

The wheel speed detecting means detects the wheel speeds of the respective wheels of the vehicle (e.g., a four wheel vehicle) For example, a vehicle speed sensor, which generates a predetermined number of pulses (vehicle speed pulses) each time the wheel rotates one time, may be provided at each wheel, and the wheel speed can be detected by counting the wheel speed pulses outputted from the vehicle speed sensor.

On the basis of the detected wheel speed, the road surface μ slope estimating means estimates, for each of the wheels, a slope of a coefficient of friction μ between the wheel and the road surface, i.e., the road surface μ slope value. The road surface μ slope estimating means may be formed, for example, by a preprocessing filter which detects, from the detected wheel speeds of the respective wheels, the wheel speed vibrations of the respective wheels as response outputs of wheel resonance systems which receive road surface disturbances; a transfer function identifying means for identifying transfer functions of the respective wheels which satisfy the detected wheel speed vibrations, by using a least squares method; and a μ slope computing means which computes, for the respective wheels, the slopes of the coefficients of friction μ between the tires and the road surface on the basis of the identified transfer functions.

Further, in a case in which an excitation torque is inputted to the wheel resonance system as an excitation input, the road surface μ slope estimating means may identify the transfer function of the wheel resonance system and compute the road surface μ slope value.

Further, in a case in which an excitation torque is inputted to the wheel resonance system as an excitation input, the road surface μ slope estimating means may identify the transfer function of the wheel resonance system from the detected excitation input and response output.

Moreover, the road surface μ slope estimating means may select, among the response outputs, only the response output which is a periodic signal, and on the basis of the selected response output, identify the transfer function of the wheel resonance system and compute the road surface μ slope value.

Further, parameters of a physical model which expresses the unsprung resonance characteristic may be identified from the wheel speed signals, and the road surface μ slope values may be computed from the identified parameters.

On the basis of the road surface μ slope values estimated for the respective wheels by the road surface μ slope estimating means, the control means distributes the braking forces to the respective wheels by controlling the braking force of each wheel.

In the present invention, on the basis of the detected wheel speeds, the road surface μ slope estimating means may estimate slopes of braking forces with respect to wheel slip speeds as the road surface μ slopes for the respective wheels, and the control means may control a braking torque of a wheel which is an object of control on the basis of the road surface μ slope of the wheel which is an object of control and the road surface μ slope of a reference wheel among the road surface μ slopes estimated by the road surface μ slope estimating means.

Namely, the braking force distribution control device may be structured by a wheel speed detecting means for detecting the wheel speeds of plural wheels; a road surface μ slope estimating means for estimating the road surface μ slopes, which are slopes of the braking forces with respect to the wheel slip speeds, on the basis of the respective wheel speeds detected by the wheel speed detecting means; and a control means which controls the braking torque of a wheel which is an object of control on the basis of, among the respective road surface μ slopes estimated by the road surface μ slope estimating means, the road surface μ slope of a reference wheel and the road surface μ slope of the wheel which is the object of control.

In accordance with the present invention, the road surface μ slope estimates the road surface μ slope for each wheel of the vehicle. Here, because the road surface μ slope is an index expressing the degree of grip of the wheel, the degree of grip of each wheel at the time of braking can be known. The control means controls the braking torque of the wheel which is the object of control, on the basis of the road surface μ slope of a reference wheel and the road surface μ slope of the wheel which is the object of control. For example, in a case in which the road surface μ slope of the wheel which is the object of control is greater than the road surface μ slope of the reference wheel, it can be understood that there is leeway in the grip force of the wheel which is the object of control. At this time, by increasing the braking torque of the wheel which is the object of control, the deceleration performance can be improved while the stability of the vehicle is maintained. On the other hand, when the road surface μ slope of the wheel which is the object of control is less than the road surface μ slope of the reference wheel, it can be understood that the grip force of the wheel which is the object of control is near the limit and does not have leeway. At this time, by reducing the braking torque of the wheel which is the object of control, the stability of the vehicle can be maintained.

In a case in which front wheels are reference wheels and rear wheels are wheels which are objects of control, when a variation between the road surface μ slope of the front wheels and the road surface μ slope of the rear wheels is greater than or equal to a predetermined value, the control means can one of maintain and reduce the braking torque of the rear wheels, and when the variation is less than the predetermined value, the control means can increase the braking torque of the rear wheels.

When the control means one of maintains and reduces the braking torque of one of the rear wheels, the control means can maintain the braking torque of another of the rear wheels as is.

In a case in which rear wheels are reference wheels and front wheels are wheels which are objects of control, when a variation between the road surface μ slope of the front wheels and the road surface μ slope of the rear wheels is greater than or equal to a predetermined value, the control means can increase the braking torque of the front wheels, and when the variation is less than the predetermined value, the control means can one of maintain and reduce the braking torque of the front wheels.

In a case in which turning inner side wheels are reference wheels and turning outer side wheels are wheels which are objects of control, when a variation between the road surface μ slope of the turning inner side wheels and the road surface μ slope of the turning outer side wheels is greater than or equal to a predetermined value, the control means can increase the braking torque of the turning outer side wheels, and when the variation is less than the predetermined value, the control means can one of maintain and reduce the braking torque of the turning outer side wheels.

In a case in which turning outer side wheels are reference wheels and turning inner side wheels are wheels which are objects of control, when a variation between the road surface μ slope of the turning outer side wheels and the road surface μ slope of the turning inner side wheels is greater than or equal to a predetermined value, the control means can one of maintain and reduce the braking torque of the turning inner side wheels, and when the variation is less than the predetermined value, the control means can increase the braking torque of the turning inner side wheels.

The control means may control the braking torque by using one of a turning inner side front wheel, a turning outer side front wheel, a turning inner side rear wheel, and a turning outer side rear wheel as a reference wheel, and using at least one other wheel as the wheel which is an object of control.

As described above, in accordance with the present invention, because the target braking forces of the respective wheels are distributed in consideration of the frictional states between the wheels and the road surface, optimal braking force distribution control can be carried out. The braking performances of the respective wheels can be elicited to the maximum extent possible, while the posture of the vehicle is maintained.

The control means of the present invention can be structured to include: a wheel target braking force computing means for computing target braking forces of the respective wheels on the basis of the estimated road surface μ slopes of the respective wheels and a target braking force of the vehicle; and a braking force control means for controlling the braking forces of the respective wheels on the basis of the computed target braking forces of the respective wheels. Namely, the braking force distribution control device can be structured so as to include a wheel speed detecting means for detecting wheel speeds of the respective wheels; a road surface μ slope estimating means for, on the basis of the detected wheel speeds, estimating, for the respective wheels, a slope of a friction of coefficient μ between the wheels and the road surface as road surface μ slope values; a wheel target braking force computing means for, on the basis of the estimated road surface μ slope values of the respective wheels and the target braking force of the vehicle, computing target braking forces for the respective wheels; and braking force control means for controlling the braking forces of the respective wheels on the basis of the computed target braking forces of the respective wheels.

The wheel target braking force computing means of the present invention computes (distributes) the target braking forces of the respective wheels on the basis of the estimated road surface μ slope values of the respective wheels and the target braking force of the vehicle as described above. Namely, the rate of distribution of the target braking force of the entire vehicle to the respective wheels is set on the basis of the road surface μ slope values.

The target braking force of the vehicle may be determined in accordance with, for example, the operation amount of the brake pedal by the driver. Namely, the braking force distribution control device of the present invention may further include a braking operation amount detecting sensor which detects a braking operation amount of a driver of the vehicle; and target braking force computing means for computing a target braking force of the vehicle on the basis of the braking operation amount. Further, in a case in which the vehicle is driven automatically, the target braking force of the vehicle may be determined, for example, in accordance with the vehicle speed or the distance between the vehicle and an obstacle thereahead or the like.

For example, the wheel target braking force computing means may compute the target braking forces of the respective wheels such that the target braking force is large for a wheel whose road surface μ slope value is high and the target braking force is small for a wheel whose road surface μ slope value is low. Namely, for example, when a large braking force is distributed to a wheel whose road surface μ slope value is low, i.e., whose degree of grip is low, it is easy for the tire to slip. Thus, the rate of distribution of the target braking force to the respective wheels is set such that the wheel target braking force is great for a wheel having a high road surface μ slope value and the wheel target braking force is small for a wheel having a low road surface μ slope value. In this way, slipping of the wheel can be prevented.

The braking force control means controls the braking forces of the respective wheels on the basis of the computed target braking forces of the respective wheels. This control of the braking forces can be carried out by using, for example, fluid pressure.

In this way, because the target braking forces of the respective wheels are distributed in consideration of the road surface μ slopes, i.e., the frictional states between the wheels and the road surface, optimal control of the braking force distribution can be carried out. The braking capability of each wheel can be elicited to the maximum extent while the appropriate posture of the vehicle is maintained.

Further, the wheel target braking force computing means may compute the target braking forces of the respective wheels such that values of the road surface μ slopes of the respective wheels are substantially equal. In this way, by computing the target braking forces of the respective wheels such that the road surface μ slope values of the respective wheels are substantially the same, the braking capability of each wheel can be exhibited to the maximum extent while the appropriate posture of the vehicle is maintained.

In a case in which it is easy for the rear wheels to slip, the wheel target braking force computing means may compute the target braking forces of the respective wheels such that values of the road surface μ slopes of rear wheels of the vehicle are greater than values of the road surface μ slopes of front wheels of the vehicle. In this way, slipping of the rear wheels can be prevented.

As described above, in accordance with the present invention, because the target braking forces of the respective wheels are distributed in consideration of the frictional states between the wheels and the road surface, optimal control of the braking force distribution can be carried out. Thus, the braking capability of each wheel can be elicited to the maximum extent while the appropriate posture of the vehicle is maintained.

BRIEF DESCRIPTION OF THE DRAWINGS

FIG. 1 is a block diagram showing a schematic structure of a braking force control device relating to an embodiment of the present invention.

FIG. 7 is a diagram for explaining a reference wheel and a wheel which is an object of control in a four wheel vehicle.

FIG. 8 is a diagram for explaining a reference wheel and a wheel which is an object of control in a four wheel vehicle.

FIG. 9 is a diagram for explaining a reference wheel and a wheel which is an object of control in a four wheel vehicle.

FIG. 10 is a diagram for explaining a reference wheel and a wheel which is an object of control in a four wheel vehicle.

FIG. 11 is a diagram for explaining a reference wheel and a wheel which is an object of control in a four wheel vehicle.

FIG. 12 is a diagram for explaining a reference wheel and a wheel which is an object of control in a four wheel vehicle.

FIG. 13 is a diagram for explaining a reference wheel and a wheel which is an object of control in a four wheel vehicle.

FIG. 14 is a diagram for explaining a reference wheel and a wheel which is an object of control in a four wheel vehicle.

FIG. 19 is a block diagram showing a specific structure of a road surface slope estimating circuit provided in the braking force control device.

FIG. 20 is a schematic structural view of a braking force distribution control device.

FIG. 26 is a schematic structural view of a vehicle in another example to which the braking force distribution control device is applied.

DETAILED DESCRIPTION OF THE PREFERRED EMBODIMENTS

Figure 2:
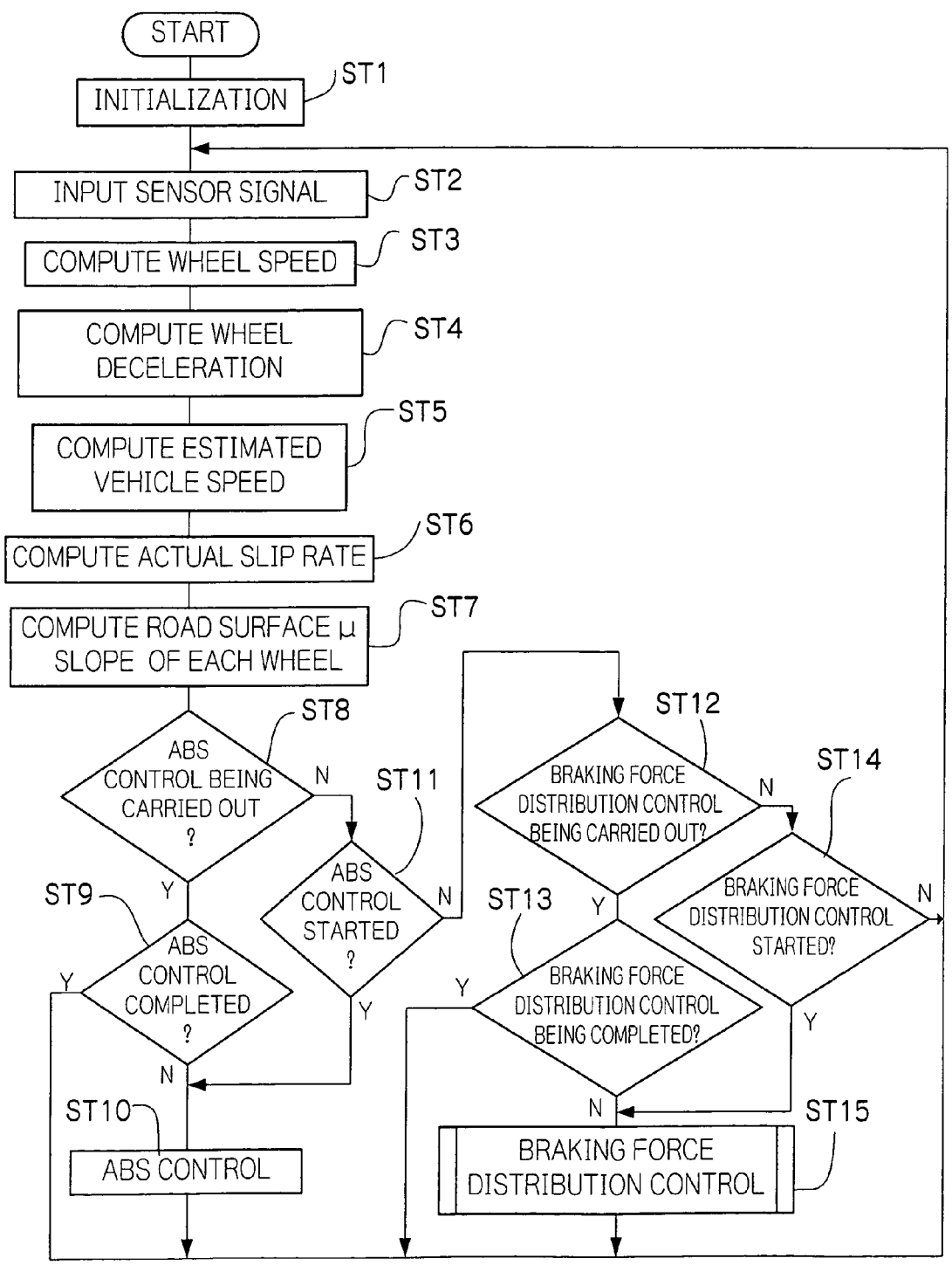
FIG. 2 is a flowchart for explaining contents of operation of the braking force control device.

Hereinafter, embodiments of the present invention will be described in detail with reference to the drawings.

First Embodiment

The present invention can be used in a vehicle which can control an ABS (antilock braking system), and can be applied, for example, to a braking force control device 1 shown in FIG. 1.

The braking force control device 1 includes a wheel speed sensor 11 which detects a wheel speed of each wheel of the vehicle; a road surface μ slope estimation circuit 12 which estimates a road surface μ slope; a variation computing circuit 13 which computes a variation between the road surface μ slope of a reference wheel and the road surface μ slope of the wheel which is the object of control; a braking force control circuit 14 which controls braking force on the basis of results of computation of the variation; and a fluid pressure circuit 15 in which the fluid pressure of the brake is controlled by the braking force control circuit 14.

At each circuit, as shown in FIG. 2, first, initialization is carried out (step ST1). Then, when a signal is input to each sensor (step ST2), the wheel speed sensor 11 computes a wheel speed (step ST3). Further, a wheel deceleration, an estimated vehicle speed, and an actual slip ratio are computed (steps ST4 through ST6). Although the vehicle deceleration can be obtained on the basis of an output signal of the wheel speed sensor 11, when there is a lateral G sensor, the output signal thereof can be used.

The road surface slope estimating circuit 12 estimates a road surface μ slope of each wheel on the basis of a wheel speed of each wheel (step ST7), and supplies these road surface μ slopes to the variation computing circuit 13. Detailed contents of the road surface slope estimating circuit 12 will be described later.

After the processing of step ST7, the braking force control circuit 14 judges whether ABS control is currently being carried out (step ST8). When ABS control is currently being carried out, the braking force control circuit 14 judges whether ABS control is completed (step ST9). When ABS control has been completed, the routine returns to step ST2. When ABS control has not been completed, ABS control is carried out as is (step ST10). When ABS control is completed, the routine returns to step ST2.

On the other hand, when the braking force control circuit 14 judges in step ST8 that ABS control is not being carried out, the braking force control circuit 14 judges whether ABS control has started (step ST11). If ABS control has started, the routine moves on to step ST10. If ABS control has not been started, the braking force control circuit 14 judges whether braking force distribution control is being carried out (step ST12).

When the braking force control circuit 14 judges in step ST12 that braking force distribution is being carried out, the braking force control circuit 14 judges whether braking force distribution control has been completed (step ST13). If braking force distribution control has been completed, the routine returns to step ST2, and if braking force distribution control is not completed, the routine moves on to step ST15. On the other hand, when the braking force control circuit 14 judges in step ST12 that braking force distribution control is not being carried out, the braking force control circuit 14 judges whether braking force distribution control has started (step ST14). When this control has started, the routine moves on to step ST15, and when this control has not started, the routine returns to step ST2.

The braking force control circuit 14 carries out braking force distribution control (step ST15), and when this control has been completed, the routine returns to step ST2. Here, first, the variation computing circuit 13 subtracts the road surface μ slope K* of a reference wheel from the road surface μ slope K of the wheel which is the object of control, so as to compute a variation (K-K*) of the road surface μ slope. Then, the braking force control circuit 14 carries out distribution of the braking force of the vehicle on the basis of this variation. Specifically, the braking force control circuit 14 carries out the processings from step ST21 through step ST25 in FIG. 3.

The braking force control circuit 14 judges whether the variation (K-K*) is not less than C1 (step ST21). When the variation (K-K*) is less than C1, the braking force control circuit 14 carries out pressure reduction control (step ST22). At this time, the smaller the variation (K-K*) is than C1, the more the braking force control circuit 14 increases the braking torque reduction amount (the pressure reduction amount of the brake fluid) of the wheel which is the object of control.

When the braking force control circuit 14 judges in step ST21 that the variation (K-K*) is not greater than C1, then, the braking force control circuit 14 judges whether the variation is greater than C2 (step ST23). If the variation is greater than C2, the braking force control circuit 14 carries out pressure increase control (step ST24). At this time, the greater the variation (K-K*) is than C2, the more the braking force control circuit 14 increases the braking torque increase amount (the pressure increase amount of the brake fluid) of the wheel which is the object of control.

When the braking force control circuit 14 judges in step ST23 that the variation (K-K*) is less than C2, the braking force control circuit 14 carries out maintaining control (step ST25) At this time, the braking force control circuit 14 maintains the current state of the braking torque (fluid pressure) of the wheel which is the object of control. In this way, when the braking force control circuit 14 moves to one of the control modes of steps ST23 through step ST25, the braking force control circuit 14 controls the fluid pressure of the brake fluid of the wheel which is the object of control of the fluid pressure circuit 15 in accordance with that mode.

Figure 4:
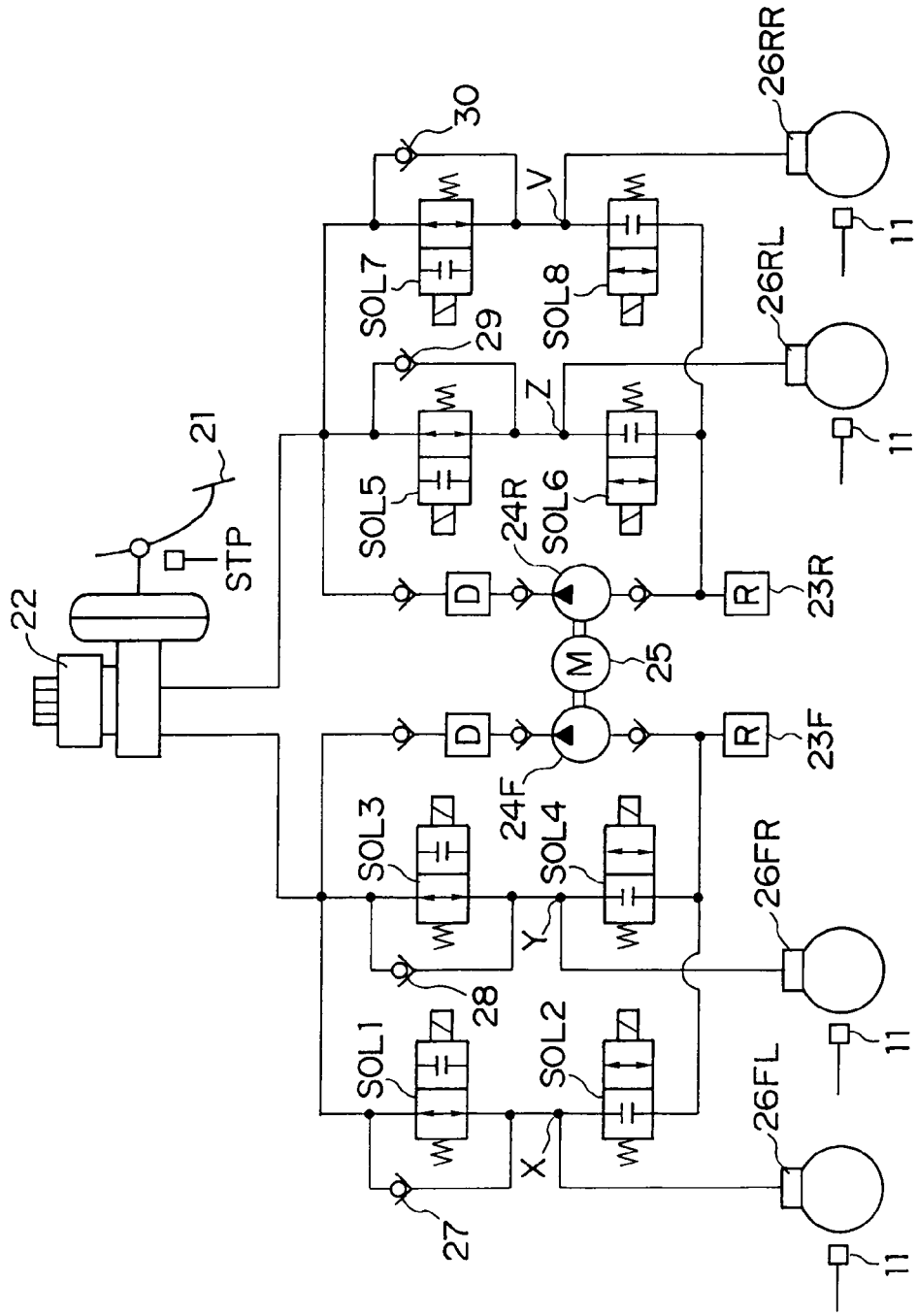
FIG. 4 is a circuit diagram showing a concrete structure of a fluid pressure circuit provided at the braking force control device.

With the fluid pressure circuit 15 as well, ABS control is possible. The structure of the fluid pressure circuit 15 is shown in FIG. 4. Specifically, the fluid pressure circuit 15 is provided with a master cylinder 22 which discharges brake fluid of a fluid pressure corresponding to the depressing force of a brake pedal 21; solenoids SOL1 through SOL8 which increase, reduce, and maintain the fluid pressure; reservoirs 23 (23F, 23R) which temporarily hold brake fluid; pumps 24 (24F, 24R) which draw-up the brake fluid stored in the reservoir 23; a motor 25 which is the motive power source of the pump 24; wheel cylinders 26 (26FL, 26FR, 26RL, 26RR) which control the wheels at a braking force corresponding to the liquid pressure; and check valves 27 through 30 which suppress flowing of the high pressure brake fluid in a predetermined direction.

The solenoid SOL1 and the solenoid SOL2, the solenoid SOL3 and the solenoid SOL4, the solenoid SOL5 and the solenoid SOL6, and the solenoid SOL7 and the solenoid SOL8, are connected in series via respective fluid pressure paths. At each group of solenoids SOL connected in series, one side thereof is connected to the master cylinder 22, whereas the other side thereof is connected to the reservoir 23.

A fluid pressure path for supplying brake fluid is provided at each of the regions between the respective ports of the solenoids SOL1, SOL3, SOL5, SOL7. The check valves 27 through 30, which are provided such that the high pressure brake fluid does not flow from the wheel cylinder 26 side port to the master cylinder 22 side port, are provided at these fluid pressure paths. The wheel cylinders 26FL, 26FR, 26RL, 26RR are connected via respective fluid pressure paths to connection points X, Y, Z, V of two solenoids SOL connected in series.

In a pressure reduction control mode, the reservoir 23 holds the brake fluid which has returned from the wheel cylinders 26. The pump 24 is driven by the motor 25 at the time when ABS control is carried out, and draws-up brake fluid which is stored in the reservoir 23, and supplies the brake fluid to the master cylinder 22 via the check valves.

The braking torque of a desired wheel can be controlled by the braking force control circuit 14 energizing an arbitrary solenoid SOL and adjusting (increasing, reducing, or holding) the fluid pressure of an arbitrary wheel cylinder 26, for the fluid pressure circuit 15 having such a structure.

As described above, due to the braking force control device 1 controlling the braking torque of the wheel which is the object of control on the basis of the road surface μ slope, at the time of brake control as well, the grip force of each wheel can always be maintained, and the vehicle can travel stably. Namely, because the braking force control device 1 controls the braking torque of the wheel which is the object of control on the basis of a road surface μ slope which is an index of the degree of grip of the wheel, the vehicle can travel stably while the degree of grip of each wheel is always known.

Figure 5:
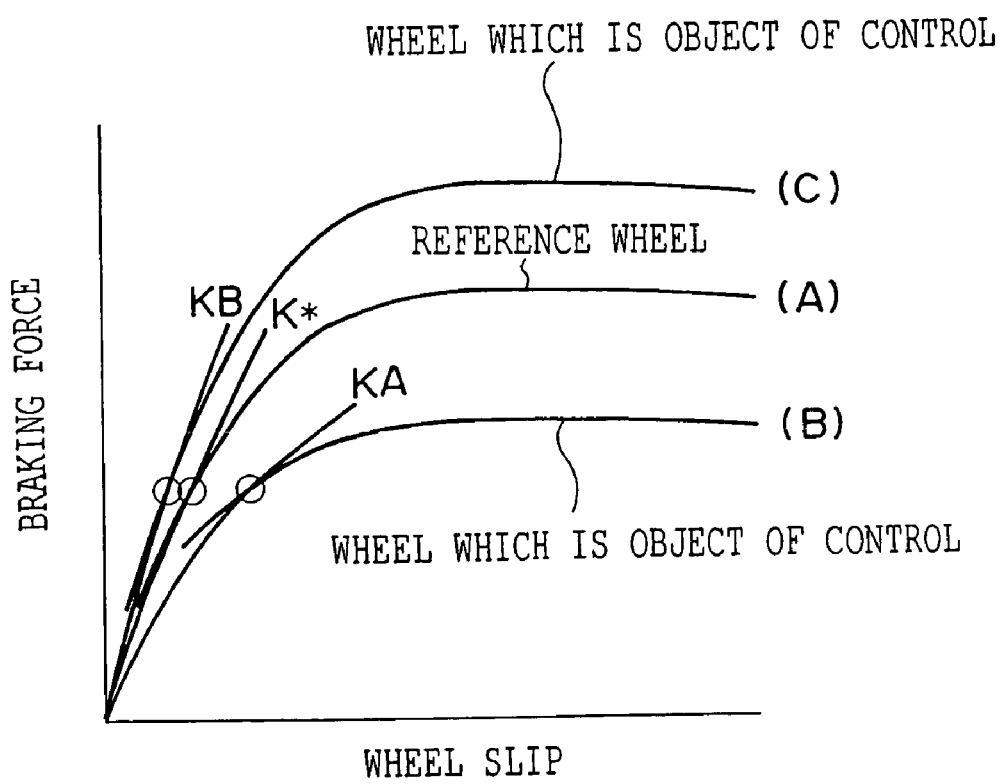
FIG. 5 is a graph showing a characteristic of braking force with respect to wheel slip for a reference wheel and a wheel which is an object of control.

For example, the braking force with respect to the wheel slip of the reference wheel has the characteristic shown in FIG. 5A. At this time, the road surface μ slope is K*. Here, given that the road surface μ slope of the wheel which is the object of control is KA (<K*), the braking force with respect to the wheel slip of this wheel has a characteristic such as that shown in FIG. 5B. In accordance with this characteristic, because the degree of grip of the wheel substantially reaches the limit, the braking torque must be reduced in order to recover the degree of grip of the tire. Thus, braking force control circuit 14 decreases, at the fluid pressure circuit 15, the fluid pressure of the wheel which is the object of control. By reducing the braking force of this wheel, the grip force of the wheel can be restored.

On the other hand, if the road surface μ slope of the wheel which is the object of control is KB (>K*), the braking force with respect to the wheel slip of this wheel has a characteristic such as that shown in FIG. 5C. In accordance with this characteristic, there is leeway up until the degree of grip of the wheel reaches the limit. Thus, the braking torque must be increased in order to more effectively utilize the degree of grip of the tire. Here, the braking force control circuit 14 increases, at the fluid pressure circuit 15, the fluid pressure of the wheel which is the object of control. By increasing the braking force of this wheel, the grip force of the wheel is increased even more.

Next, the selection of the reference wheel will be described by using, as an example, a four-wheeled vehicle which is decelerating while turning left.

Figure 6:
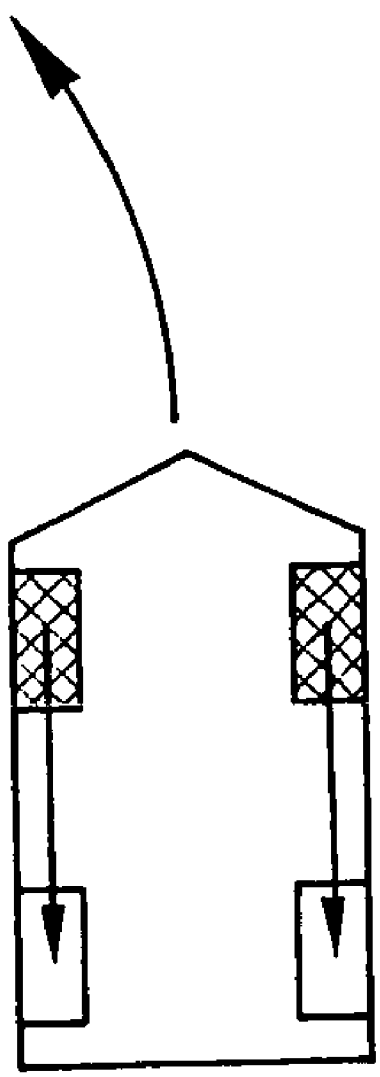
FIG. 6 is a diagram for explaining a reference wheel and a wheel which is an object of control in a four wheel vehicle.

For example, as shown in FIG. 6, the turning inner side front wheel may be set as the reference wheel, and the turning inner side rear wheel may be set as the wheel which is the object of control. Similarly, the turning outer side front wheel may be set as the reference wheel, and the turning outer side rear wheel may be set as the wheel which is the object of control.

Further, as shown in FIG. 7, it is possible to determine the reference wheel and the control wheel in the same way as in FIG. 6, and then, to carry out what is known as select-low control in accordance with, among these two wheels, the wheel which has the lower road surface μ slope or the wheel which has the lower braking torque. In this way, by carrying out select-low control, the vehicle stability can be improved even more. It is possible to select select-low control only in cases in which vehicle stability is particularly required, such as when there is a low road surface μ or when the turn is large.

As shown in FIG. 8, the average road surface μ slope of the two front wheels or the road surface μ slope of either of the two front wheels may be used as the road surface μ slope of the reference wheel, and the respective rear wheels may be controlled. Or, as shown in FIG. 9, the reference wheel and the control wheel may be determined in the same way as in FIG. 8, and so-called select-low control may be carried out in accordance with, among the two rear wheels, the wheel having the lower road surface μ slope or the wheel having the lower braking torque.

As shown in FIG. 10, the turning outer side front wheel may be set as the reference wheel and the turning inner side front wheel may be set as the wheel which is the object of control, and the turning outer side rear wheel may be set as the reference wheel and the turning inner side rear wheel may be set as the wheel which is the object of control. At this time, as shown in FIG. 11, the average road surface μ slope of the two turning outer side wheels or the road surface μ slope of either of these two wheels may be used as the road surface μ slope of the reference wheel, and the turning inner side wheels may be controlled.

As shown in FIG. 12, the turning inner side front wheel may be used as the reference wheel and the turning outer side front wheel may be used as the wheel which is the object of control, and the turning inner side rear wheel may be set as the reference wheel and the turning outer side rear wheel may be set as the wheel which is the object of control. At this time, as shown in FIG. 13, the average road surface μ slope of the two turning inner side wheels or the road surface μ slope of either of these two wheels may be used as the road surface μ slope of the reference wheel, and the turning outer side wheels may be controlled.

Figure 15:
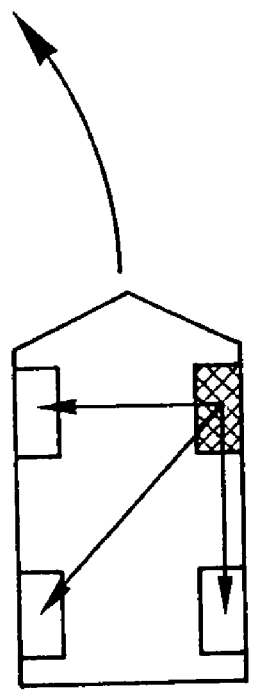
FIG. 15 is a diagram for explaining a reference wheel and a wheel which is an object of control in a four wheel vehicle.

As shown in FIG. 14, the turning inner side front wheel may be used as the reference wheel, and the other wheels may be used as wheels which are objects of control. Similarly, as shown in FIG. 15, the turning outer side front wheel may be used as the reference wheel, and the other wheels may be used as wheels which are the objects of control. In FIGS. 14 and 15, selectro control may be carried out on the wheels which are the objects of control.

Figure 16:
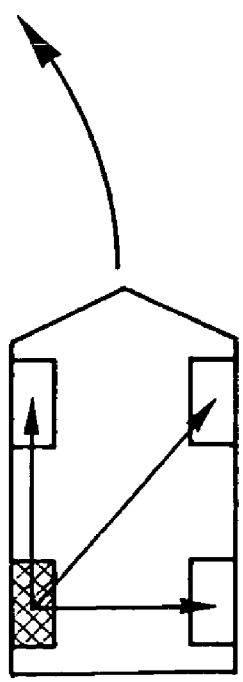
FIG. 16 is a diagram for explaining a reference wheel and a wheel which is an object of control in a four wheel vehicle.
Figure 17:
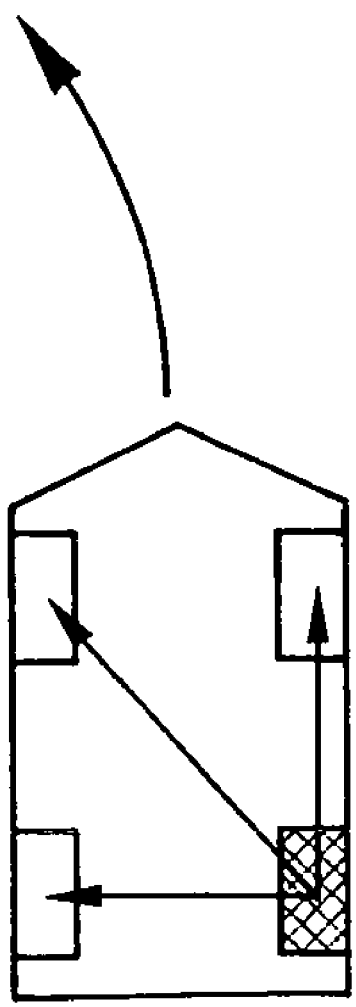
FIG. 17 is a diagram for explaining a reference wheel and a wheel which is an object of control in a four wheel vehicle.

Further, as shown in FIG. 16, the turning inner side rear wheel may be set as the reference wheel, and the other wheels may be set as wheels which are objects of control. Similarly, as shown in FIG. 17, the turning outer side rear wheel may be the reference wheel, and the other wheels may be wheels which are objects of control.

In the present invention, selection of the reference wheel is not limited to the above described methods. Any other method of selection is equally applicable provided that the road surface μ slope of a reference wheel(s) is used in control of other wheel(s).

Figure 3:
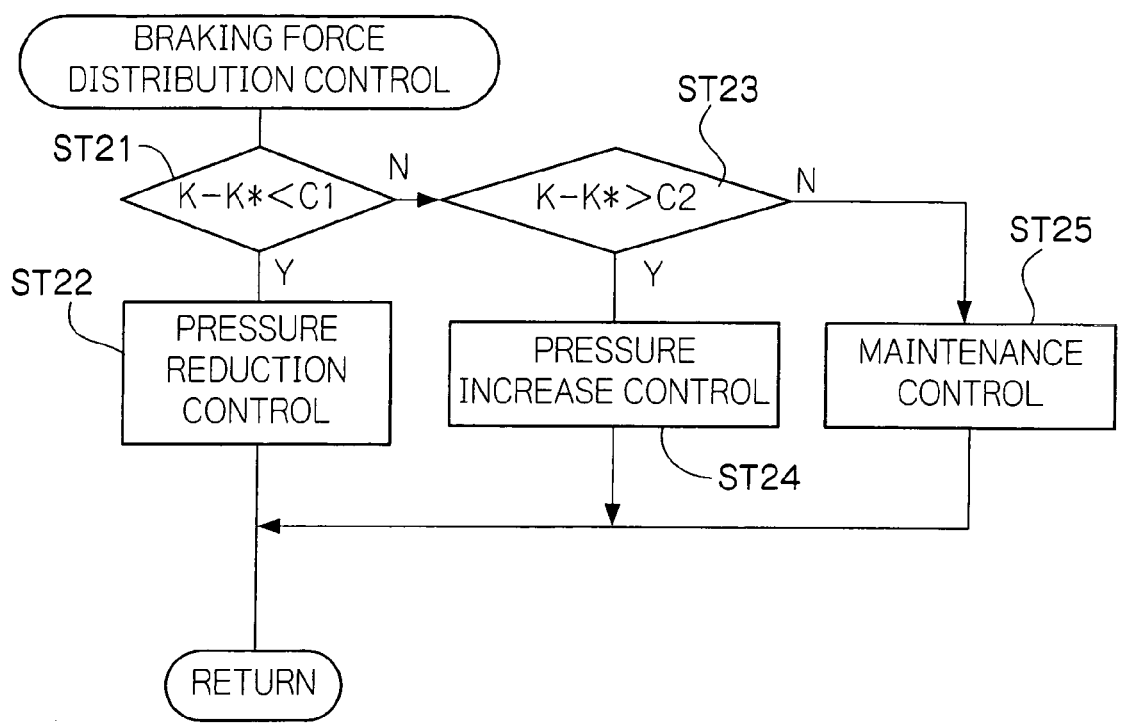
FIG. 3 is a flowchart for explaining contents of operation for braking force distribution of the braking force control device.

Further, in the present embodiment, braking force distribution control is carried out in accordance with the flow-charts of FIGS. 2 and 3. However, braking force distribution control may be carried out at times when all of the following five conditions are satisfied.

16. a braking operation is effected by the driver
17. ABS control is currently not being carried out
18. K−K*<C1 or K−K*>C2
19. vehicle deceleration is a predetermined value or greater
20. a vehicle turning state is a predetermined value or greater Here, the presence or absence of a braking operation by the driver can be judged by the on/off state of a stop switch. Further, in a case in which there is a stroke sensor of a brake pedal or a depressing force sensor or a fluid pressure sensor, a signal from such a sensor can be used. The vehicle turning state can be determined from the difference in the left and right wheel speeds. Or, in a case in which there is a steering angle sensor, a yaw rate sensor, or a transverse G sensor, the vehicle turning state can be determined from the output signal of such a sensor. Note that if the condition K−K*>C2 is omitted, the braking torque cannot be increased to a level beyond that obtained by operation of the driver.

Second Embodiment

Figure 18:
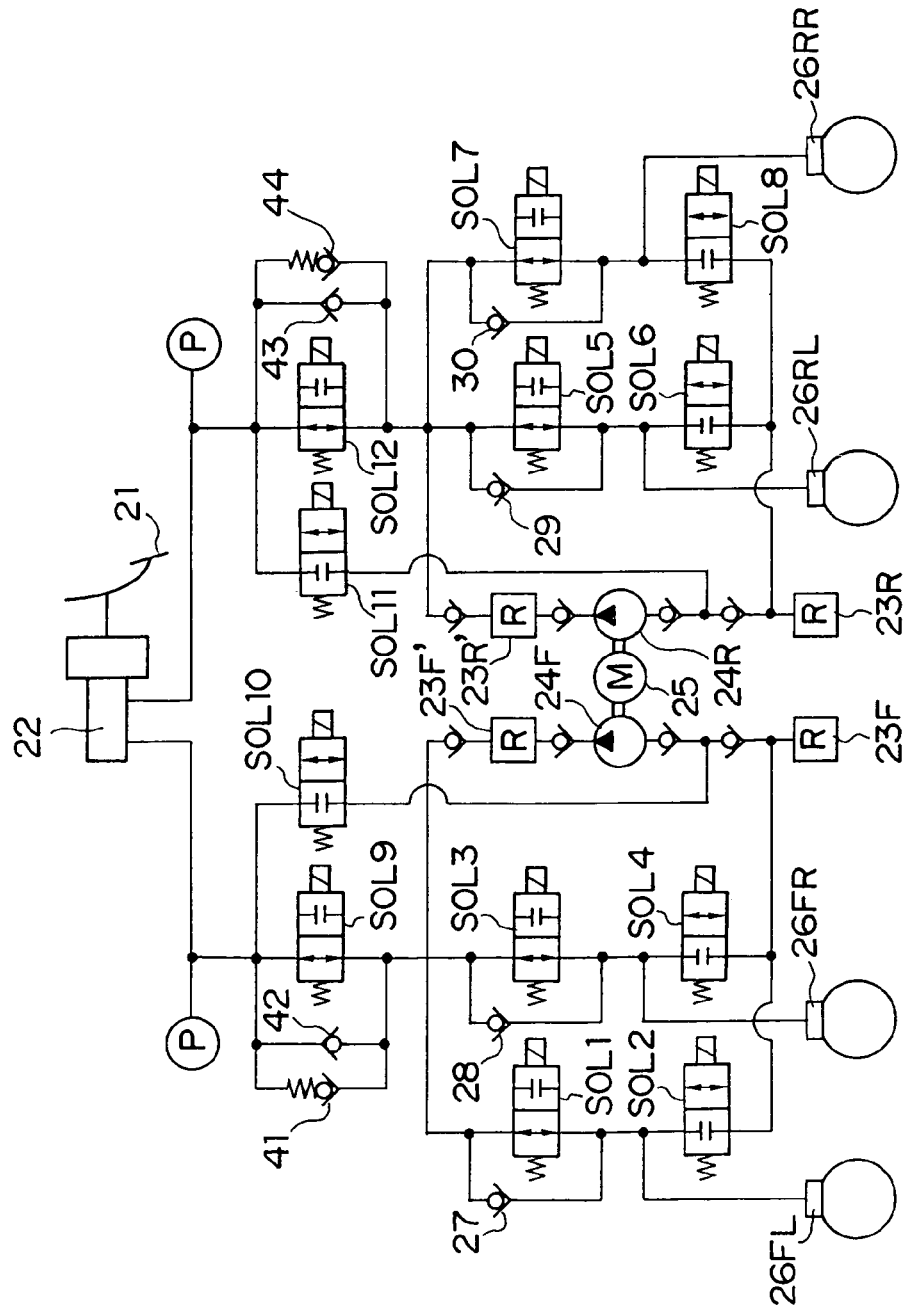
FIG. 18 is a circuit diagram showing another example of a fluid pressure circuit.

In the above embodiment, description was given by using the fluid pressure circuit 15 shown in FIG. 4 as an example. However, a fluid pressure circuit 15A having the structure shown in FIG. 18 may be used. Note that, in FIG. 18, portions which are the same as those of FIG. 15 are denoted by the same reference numerals, and detailed description thereof will be omitted.

The fluid pressure circuit 15A includes the master cylinder 22 which discharges brake fluid of a fluid pressure corresponding to the depressing force of the brake pedal 21; solenoids SOL1 through SOL12 which increase, reduce, and maintain the fluid pressure; the reservoirs 23 which temporarily hold brake fluid; the pumps 24 which draw-up the brake fluid stored in the reservoir 23; the motor 25 which is the motive power source of the pump 24; the wheel cylinders 26 (26FL, 26FR, 26RL, 26RR) which control the wheels with a braking force corresponding to the liquid pressure; and check valves 27 through 30 and 41 through 44 which suppress flowing of the high pressure brake fluid in a predetermined direction. Note that the relationship between the solenoids SOL1 through SOL8, the wheel cylinders 26, and the check valves 27 through 30 is the same as in FIG. 4.

One port of the solenoid SOL9 is connected to the master cylinder 22. The other port thereof is connected to the master cylinder 22 side ports of the solenoids SOL1, SOL3. One port of the solenoid SOL12 is connected to the master cylinder 22. The other port thereof is connected to the master cylinder 22 side ports of the solenoids SOL5, SOL7.

Two fluid pressure paths for supplying brake fluid are provided in parallel between each port of the solenoids SOL9, SOL12. The check valves 41 through 44, which are provided such that the high pressure brake fluid does not flow in, are provided at these fluid pressure paths.

Ones of ports of the solenoids SOL10, SOL12 are connected to the master cylinder 22. The other ports thereof are connected to reservoirs 23F', 23R' via the check valves.

The pump 24 draws up, via the check valves, the brake fluid stored in the reservoirs 23F, 23R, and temporarily stores the brake fluid in the reservoirs 23F', 23R', and then supplies the brake fluid to the master cylinder 22.

The braking force control circuit 14 can control the braking torque of a desired wheel by energizing an arbitrary SOL and adjusting (increasing, decreasing, or maintaining) the fluid pressure of any arbitrary wheel cylinder 26, for the fluid pressure circuit 15A having such a structure.

Here, the road surface slope estimating circuit 12 will be described in detail. The road surface slope estimating circuit 12 relating to the present embodiment computes the μ slope in a case in which only a road surface disturbance $\Delta T_d$ is inputted to a wheel resonance system as an excitation input.

As shown in FIG. 19, the road surface slope estimating circuit 12 is formed by a preprocessing filter 51, a transfer function identifying circuit 52, and a μ slope computing circuit 53. The preprocessing filter 51 detects, from a wheel speed ω1 of the wheel detected by the wheel speed sensor 11, a wheel speed vibration $\Delta\omega_1$ of the wheel which serves as a response output of a wheel resonance system which receives a road surface disturbance $\Delta T_d$. The transfer function identifying circuit 52 uses the least squares method to identify the transfer function of the wheel which satisfies the wheel speed vibration $\Delta\omega_1$. The μ slope computing circuit 53 computes for the wheel the slope of the friction coefficient μ between the tire and the road surface, on the basis of the identified transfer function.

The preprocessing filter 51 can be formed by a bandpass filter, through which only pass frequency components of a given band whose center is a frequency which is surmised to be the resonance frequency of the wheel resonance system, or by a bypass filter, through which only pass frequency components of a high band including the resonance frequency component. The bandpass filter or the bypass filter fixes the parameter, which regulates the frequency characteristic, to a fixed value.

The output of the preprocessing filter 51 is an output from which direct current components are removed. In other words, only the wheel speed vibration $\Delta\omega_1$ around the wheel speed ω1 is extracted.

Here, the transfer function F(s) of the preprocessing filter 51 is:

$$F(s) = \frac{1}{\sum_{i=0}^{m} c_i s^{m-1}} \quad (1)$$

wherein $c_i$ is a coefficient of the filter transfer function, and s is a Laplacean.

Next, the computational formula on which the transfer function identifying circuit 52 depends will be derived. Note that in the present embodiment, the computation of the preprocessing filter 51 is carried out included within the operation of the transfer function identifying circuit 52.

First, the transfer function which is to be identified is two-dimensionally modeled by using the road surface disturbance $\Delta T_d$ as the excitation input, and the wheel speed vibration $\Delta\omega_1$ detected by the preprocessing filter 51 at this time as the response output. Namely, the following vibration model is assumed.

$$\Delta \omega_1 = \frac{b_2}{\sum_{i=0}^{2} a_i s^{2-i}} \Delta T_d + v, \ a_0 = 1 \qquad (2)$$

Here, v is the observed noise which is included at the time of observing the vehicle speed signal. By modifying formula (2), the following formula is obtained.

$$\sum_{i=0}^{2} a_i s^{2-i} \Delta \omega_1 = b_2 \Delta T_d + \sum_{i=0}^{2} a_i s^{2-i} v \qquad (3)$$

First, the formula obtained by applying the preprocessing filter of formula (1) to formula (3) is digitized. At this time, $\Delta\omega 1$, $\Delta Td$, and v are expressed as digitized data $\Delta\omega 1(k)$, $\Delta Td(k)$, and v(k) (k is a sampling number; k=1, 2, 3, . . . ) which are sampled for each sampling cycle Ts. Further, the Laplacean s can be digitized by using a predetermined digitizing method. In the present embodiment, as one example, digitization is carried out by using the following bilinear conversion. Note that d is a one sample delay operator.

$$s = \frac{2}{T_S} \cdot \frac{1-d}{1+d}$$

Further, the degree m of the preprocessing filter is preferably 2 or more. Thus, in the present embodiment, in consideration of the computation time, m=2, and the following formula is thereby obtained.

$$\sum_{i=0}^{2} a_i \xi_{yi}(k) = b_2 \xi_{u2}(k) + \sum_{i=0}^{2} a_i \xi_{vi}(k) \qquad (4)$$

wherein $$\xi_{yi}(k) = \left(\frac{T_s}{2}\right)^i (1+d)^i (1-d)^{2-i} F_0(d) \Delta \omega_1(k) \qquad (5)$$

$$\xi_{u2}(k) = \left(\frac{T_S}{2}\right)^2 (1+d)^2 F_0(d) \Delta T_d(k) \qquad (6)$$

$$\xi_{vi}(k) = \left(\frac{T_S}{2}\right)^i (1+d)^i (1+d)^{2-i} F_0(d) v(k) \qquad (7)$$

$$F_0(d) = \frac{1}{\sum_{i=0}^{2} c_i \left(\frac{T_S}{2}\right)^i (1+d)^i (1-d)^{2-i}} \qquad (8)$$

Further, in order to identify the transfer function from the respective data of the wheel speed vibrations $\Delta\omega 1$, formula (4) is converted, on the basis of the least squares method, into the following formula so as to become a linear function with respect to the parameter which is to be identified. Note that "T" transposes a matrix.

$$\xi_{y0}(k) = \zeta^T(k)\theta + r(k) \qquad (9)$$

Here, $$\zeta(k) = [-\xi_{y1}(k) - \xi_{y2}(k)]^T \qquad (10)$$

$$\theta = [a_1 a_2]^T$$

$$r(k) = b_2 \xi_{u2}(k) + \sum_{i=0}^{2} a_i \xi_{vi}(k)$$

In the above formulas, θ is a parameter of the transfer function to be identified.

At the transfer function identifying circuit 52, by applying the least squares method, the unknown parameter θ is estimated for the respective data which successively apply the digitized data of the detected wheel speed vibration $\Delta\omega 1$ to formula (9). In this way, the transfer function is identified.

Specifically, the detected wheel speed vibration $\Delta\omega 1$ is converted into digitized data $\Delta\omega(k)$ (k=1, 2, 3, . . . ). The data are N point sampled, and by using the following least squares method computational formula, the parameter θ of the transfer function is estimated.

$$\hat{\theta}(N) = \left[\sum_{k=1}^{N} \rho^{N-k} \zeta(k) \zeta^T(k)\right]^{-1} \left[\sum_{k=1}^{N} \rho^{N-k} \zeta(k) \xi_{y0}(k)\right] \qquad (11)$$

Here, the value capped by the carat mark (i.e., the mark) is defined as being an estimated value.

Further, the least squares method may carry out computation as a successive type least squares method which determines the parameter θ by the following recurrence formula.

$$\hat{\theta}(N) = \hat{\theta}(N-1) + h(N)[\xi_{y0}(N) - \zeta^T(N)\hat{\theta}(N-1)] \qquad (12)$$

$$h(N) = \frac{P(N-1)\zeta(N)}{\rho + \zeta^T(N)P(N-1)\zeta(N)} \qquad (13)$$

$$P(N) = \frac{1}{\rho}\{I - h(N)\zeta^T(N)\}P(N-1) \qquad (14)$$

Here, ρ is a so-called forgetting coefficient, and is usually set to a value of 0.95 to 0.99. At this time, the initial value may be:

$$\hat{\theta}(-1)=0, P(-1)=aI$$

wherein a is a sufficiently large positive number.

Further, as a method for reducing the estimation error of the least squares method, any of various correction least squares methods may be used. In the present embodiment, an example will be described which uses an auxiliary variable method, which is a least squares method into which an auxiliary variable is introduced. In accordance with this method, at the stage when the relation of formula (9) is obtained, the parameter of the transfer function is estimated by using the following formula, by using m(k) as the auxiliary variable.

$$\hat{\theta}(N) = \left[\sum_{k=1}^{N} \rho^{N-k} m(k)\zeta^T(k)\right]^{-1} \left[\sum_{k=1}^{N} \rho^{N-k} m(k)\xi_{y0}(k)\right] \quad (15)$$

Further, successive computation is carried out as follows.

$$\hat{\theta}(N)=\hat{\theta}(N-1)+h(N)[\xi_{y0}(N)-\zeta^T(N)\hat{\theta}(N-1)] \quad (16)$$

$$h(N) = \frac{P(N-1)m(N)}{\rho + \zeta^T(N)P(N-1)m(N)} \quad (17)$$

$$P(N) = \frac{1}{\rho}\{I - h(N)\zeta^T(N)\}P(N-1) \quad (18)$$

The principles of the auxiliary variable method are as follows. By substituting formula (9) into formula (15), the following formula is obtained.

$$\hat{\theta}(N) = \theta + \left[\sum_{k=1}^{N} \rho^{N-k} m(k)\zeta^T(k)\right]^{-1} \left[\sum_{k=1}^{N} \rho^{N-k} m(k)r(k)\right] \quad (19)$$

Thus, if the auxiliary variable is selected such that the second term at the right side of formula (19) becomes zero, the estimated value of θ matches the actual value of θ. Thus, in the present embodiment, as the auxiliary variable, a variable is used which is delayed to the extent that $\zeta(k)=[-\xi y1(k)-\xi y2(k)]^T$ is not correlated with the formula error r(k). Namely, $$m(k)=[\xi_{y1}(k-L)-\xi_{y2}(k-L)]^T \quad (20)$$

wherein L is the delay time.

After the transfer function is identified as described above, at the μ slope computation circuit 53, a physical amount which relates to the μ slope $D_0$ is computed as:

$$\frac{\hat{a}_2}{\hat{a}_1} = \frac{D_0}{J_1 + J_2} \quad (21)$$

In this way, when a physical amount relating to the road surface μ slope $D_0$ can be computed from formula (21), it can easily be judged that the friction characteristic between the tire and the road surface is in a saturated state, for example, when the physical amount is small.

The above-described road surface slope estimating circuit 12 is a structure in which a parameter, which stipulates the frequency characteristic of the bandpass filter or the bypass filter, is fixed to a constant value at the preprocessing filter 51. However, this parameter may be varied in accordance with the parameter identified at the transfer function identifying circuit 52. Namely, an adaptation circuit, which varies the characteristic of the preprocessing filter 51 in accordance with the parameter identified at the transfer function identifying circuit 52, may be additionally provided (as in the second aspect of the first embodiment of JP-A No. 11-78843 (refer to FIG. 9 and the like)).

Further, in a case in which an excitation torque ΔT1 is inputted to the wheel resonance system as an excitation input, the road surface slope estimating circuit 12 may identify the transfer function of the wheel resonance system and compute the road surface μ slope (as in the first aspect of the third embodiment of JP-A No. 11-78843 (refer to FIG. 13 and the like)).

Moreover, in a case in which an excitation torque ΔT1 is inputted to the wheel resonance system as an excitation input, the road surface slope estimating circuit 12 may identify the transfer function of the wheel resonance system from the detected excitation input and response output (as in the first aspect of the fourth embodiment of JP-A No. 11-78843 (refer to FIG. 16 and the like)).

In addition, the road surface slope estimating circuit 12 may select, from among the response outputs, only the response output which is a periodic signal, and identify the transfer function of the wheel resonance system on the basis of the selected response output, and compute the μ slope (as in the fifth embodiment of JP-A No. 11-78843 (refer to FIG. 18 and the like)).

In the above-described examples, the output response for the excitation input to the wheel resonance system including the friction characteristic between the tire and the road surface is detected. The transfer characteristic of the wheel resonance system from the excitation input to the response output is expressed as a vibration model which includes, as the unknown factor of the wheel state, at least a physical amount relating to the ease of slippage between the tire and the road surface. On the basis of the vibration model, the unknown factor is estimated such that at least the detected response output is substantially satisfied.

The present invention is not limited to the same, and the following is possible. A parameter of a physical model which expresses an unsprung resonance characteristic is identified from the wheel speed signal. The road surface μ slope is computed as a physical amount which estimates a physical amount relating to the ease of slippage between the road surface and the wheel from the identified parameter (refer to the description of the embodiments in Japanese Patent Application No. 10-281660).

In the above-described examples, the road surface μ slope is computed as the physical amount relating to the ease of slippage between the road surface and the wheel. However, the present invention is not limited to the same. A slope of braking torque with respect to slip speed (i.e., a braking torque slope), a slope of driving torque with respect to slip speed (i.e., a driving torque slope), a minute vibration, or the like may be determined.

Namely, the braking torque slope or the driving torque slope may be computed on the basis of time series data of wheel speed which is detected each time a predetermined sampling time elapses (refer to FIG. 1 and the like of JP-A No. 10-114263).

Further, the braking torque slope may be computed on the basis of time series data of wheel deceleration which is detected each time a predetermined sampling time elapses, and on the basis of the braking torque detected each time a predetermined sampling time elapses or time series data of a physical amount which relates to this braking torque (refer to FIGS. 2, 3 and the like of JP-A No. 10-114263).

Further, the braking force may be minutely excited at the resonance frequency of a vibration system formed from the vehicle and the wheel and the road surface, and a minute gain, which is the ratio of the extremely small amplitude of the resonance frequency component of the wheel speed with respect to the minute amplitude of the braking force at the time the braking force is minutely excited, may be computed (see FIG. 4 and the like of JP-A No. 10-114263).

Third Embodiment

A third embodiment of the present invention will be described hereinafter with reference to the drawings.

FIG. 20 shows a braking force distribution control device 60 in which the present invention is applied to a braking system of a vehicle. As shown in FIG. 20, the braking force distribution control device 60 includes a braking operation sensor 62, a vehicle braking force target setting section 64, an each wheel target braking force setting section 66, a vehicle speed sensor 68, a road surface μ slope setting section 70, and a braking force control means 72.

The vehicle braking force target setting section 64, the each wheel target braking force setting section 66, and the road surface μ slope setting section 70 are included in an ECU (electrical control unit) 74.

Figure 21:
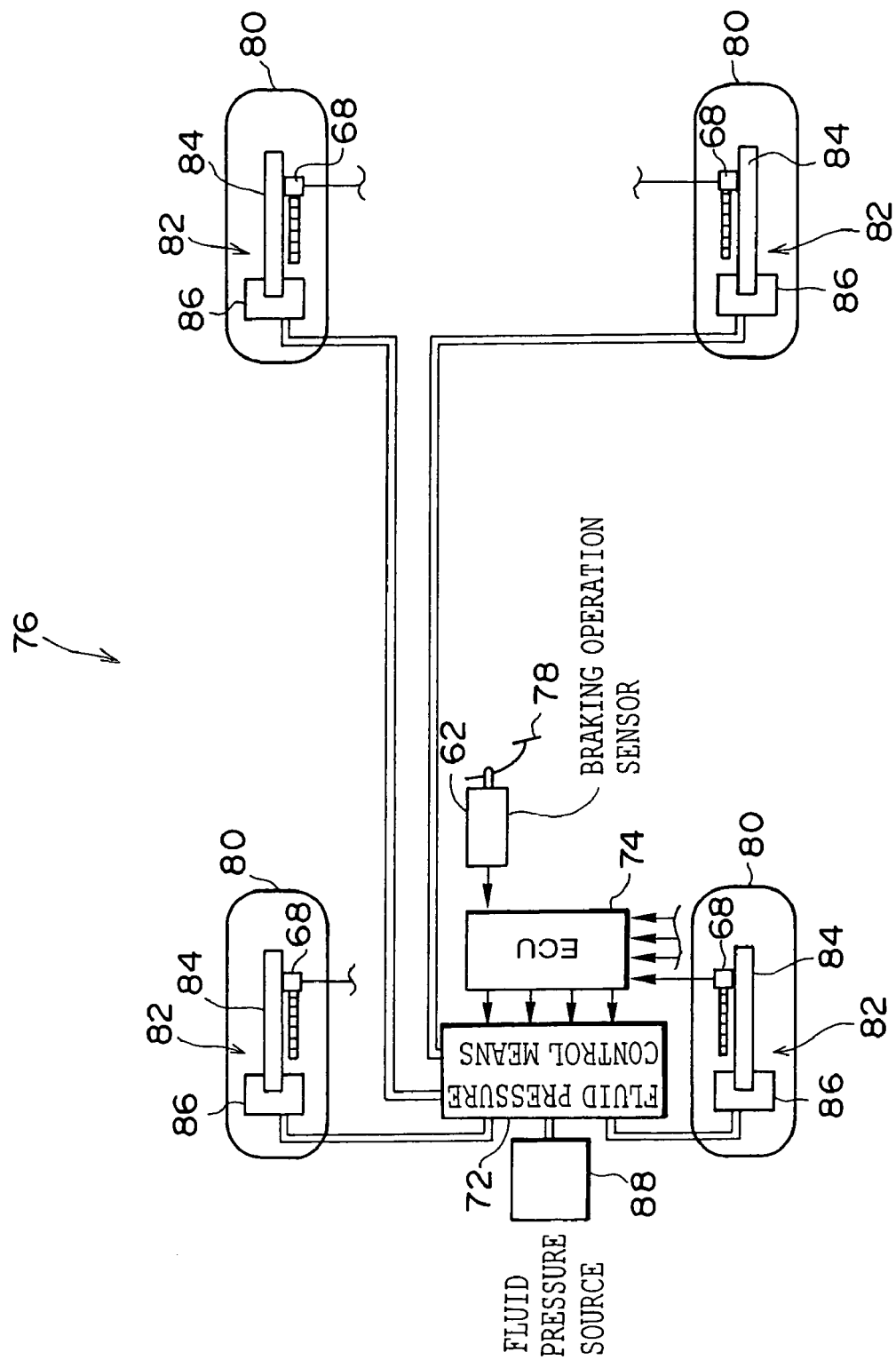
FIG. 21 is a schematic structural view of a vehicle to which the braking force distribution control device is applied.

This braking force distribution device 60 is called, for example, a so-called brake by wire (BBW) such as shown in FIG. 21, and is applicable to a vehicle in which operation of the driver is electronically transferred to the vehicle brake.

The brake system of a vehicle 76 shown in FIG. 21 is an electro-hydraulic brake system (EHB). At this EHB, an amount of operation of a brake pedal 78 by the driver (not shown) is detected by the braking operation sensor 62. For example, a stroke sensor, which detects the amount of stroke at the time the brake pedal 78 is depressed, or a depression sensor, which detects the depression force of the brake pedal 78, or the like is used as the braking operation sensor 62. Further, a fluid pressure sensor may be used in a case in which a master cylinder is provided.

A vehicle target braking force is set at the vehicle target braking force setting section 64 of the ECU 74, on the basis of the detection signal from the braking operation sensor 62. At the each wheel target braking force setting section 66, a target braking force of each wheel 80 is set (distributed) on the basis of the vehicle target braking force and the road surface μ slopes of the respective wheels which are estimated by the road surface μ slope estimating section 70.

Figure 22:
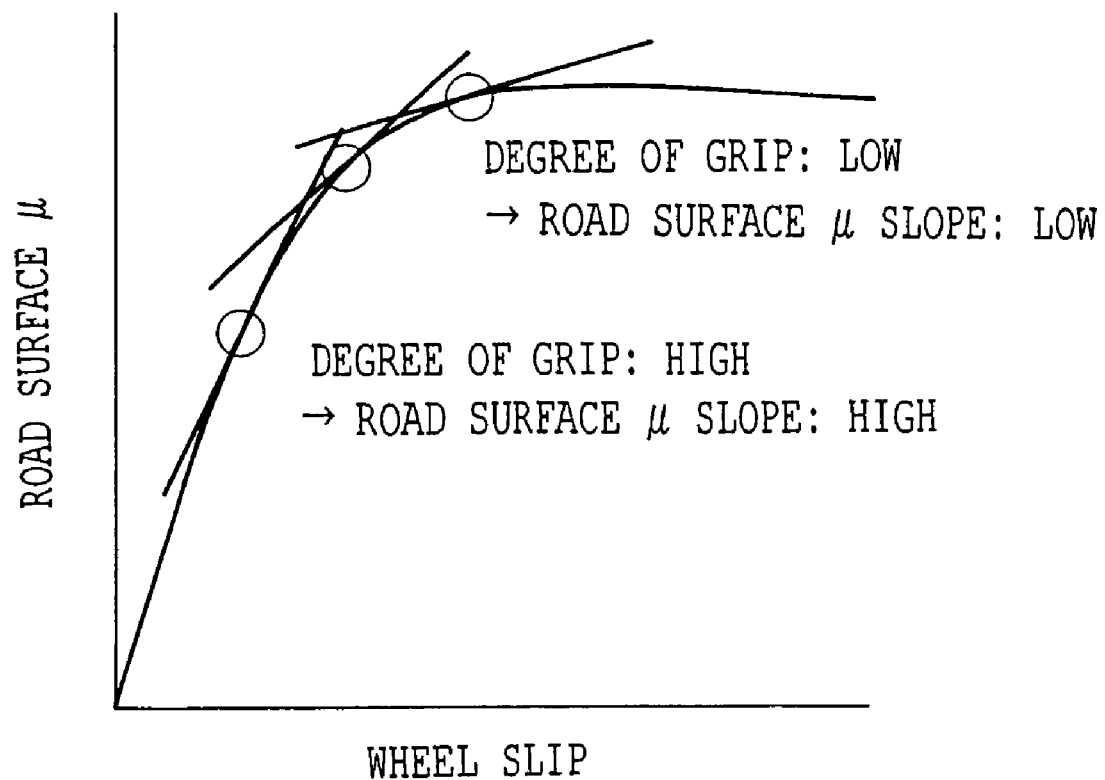
FIG. 22 is a graph showing a relationship between wheel slip and road surface μ.

When the road surface μ (a value obtained by dividing the braking force by the orthogonal load) is plotted with respect to the vehicle slip in the tire characteristic, a curve (generally called the μ—S curve) such as that shown in FIG. 22 is obtained. The road surface μ slope is defined as a value with respect to the wheel slip (slip speed) of the road surface μ.

As shown in FIG. 22, when the wheel slip is small and the degree of grip of the tire is large, the value of the road surface μ slope is large. When the wheel slip is large and the grip deteriorates, the value of the road surface μ slope is small. At the peak of the road surface μ, the road surface μ slope is substantially zero. In this way, because the value of the road surface μ slope is an index which directly expresses the friction characteristic between the tire and the road surface, braking force distribution which corresponds to the degree of grip of the tire can be carried out by effecting distribution control of the braking force on the basis of the values of the road surface μ slopes. Note that the value of the road surface μ slope is estimated on the basis of the wheel speed detected by the wheel speed sensor 68 provided for each of the wheels 80.

On the basis of the set target braking forces of the respective wheels, the brake fluid pressures of wheel brakes 82 of the respective wheels 80 are controlled by the fluid pressure control means (braking force control means) 72. For example, a disc brake or a drum brake is used as the wheel brake 82.

As shown in FIG. 21, the disc brake is provided with a caliper 86. The caliper 86 has a disk 84 which rotates together with the wheel 80 and brake pads (friction materials) for sandwiching the disk 84. Due to the fluid pressure from a fluid pressure source 88 which is controlled by the fluid pressure control means 72, the brake pads are pushed inwardly and sandwich the disc, such that the wheel 80 brakes. Note that a linear valve or a device which increases and decreases the capacity of the fluid pressure chamber is used as the fluid pressure control means 72.

The road surface μ slope estimating section 70 relating to the present embodiment computes the μ slope in a case in which only a road surface disturbance ΔTd is inputted to a wheel resonance system as an excitation input. The road surface μ slope estimating section 70 has the same structure as that of the above-described road surface μ slope estimating circuit 12, and therefore, detailed description thereof will be omitted.

Figure 23:
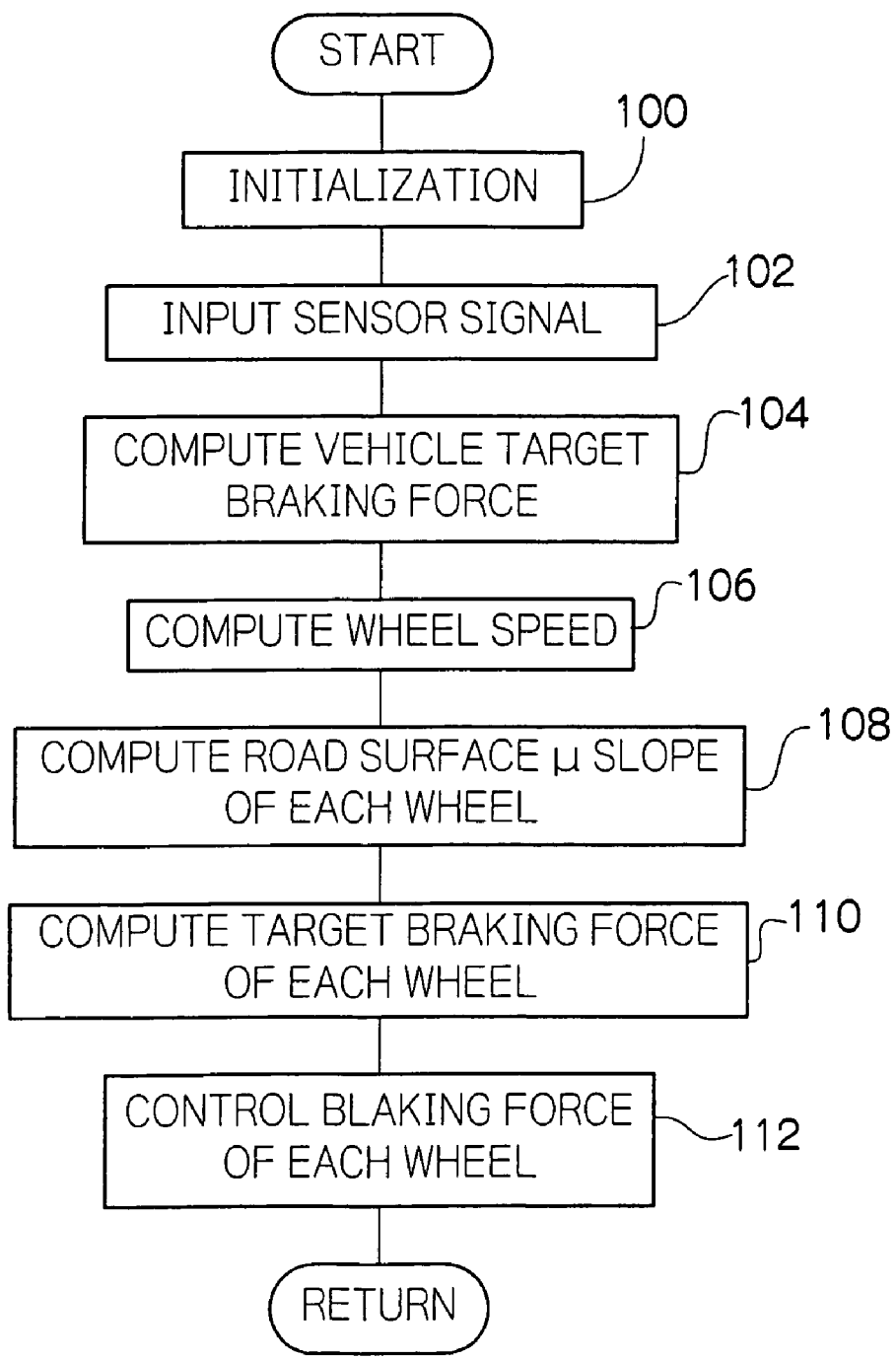
FIG. 23 is a flowchart of a control routine which is executed at the braking force distribution control device.

Next, control carried out at the braking force distribution device 60 will be described as operation of the present embodiment in accordance with the flowchart of FIG. 23.

First, in step 100, initialization of each section is carried out. In subsequent step 102, a signal, which corresponds to the braking operation amount of the brake pedal 78 by the driver, is inputted to the vehicle target braking force setting section 64 from the braking operation sensor 62.

In next step 104, at the vehicle target braking force setting section 64, a vehicle target braking force BF* is set on the basis of the signal which is inputted from the braking operation sensor 62 and which corresponds to the braking operation amount.

The vehicle target braking force BF* is determined unmistakably with respect to the braking operation amount. First, a dead zone region (so-called play of the brake pedal 78) with respect to braking operation is provided (the vehicle target braking force is zero). Further, the target vehicle braking force at the initial stages of braking at which the braking operation amount is relatively low, is set to be high (region (1) in FIG. 24). In this way, the efficacy of the brake can be improved in the initial stages of braking and at a low vehicle deceleration.

Figure 24:
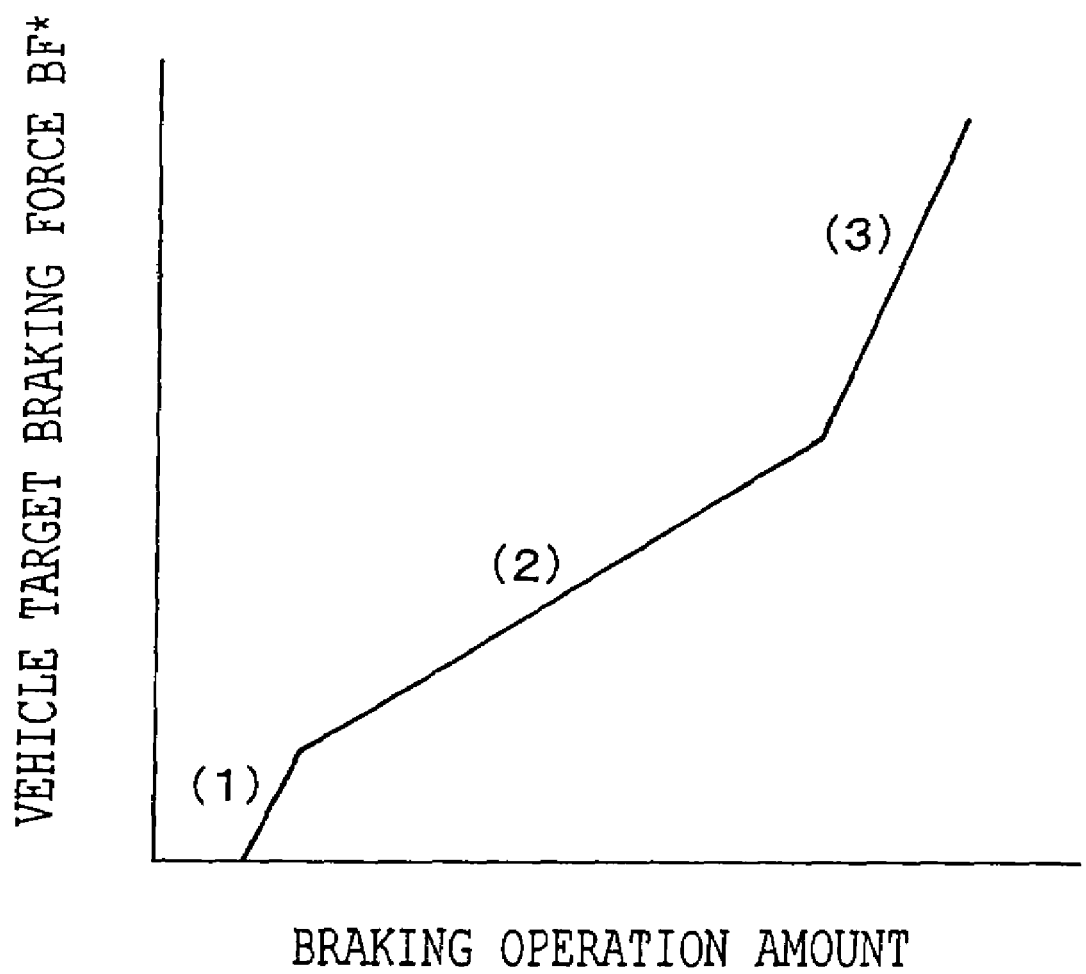
FIG. 24 is a graph showing a relationship between a braking operation amount and a vehicle target braking force.

In a region of a braking operation amount of an intermediate degree which corresponds to a deceleration of an intermediate degree of the vehicle 76, the set gain (inclination) of the vehicle target braking force is set to be low (region (2) in FIG. 24). The ability of the driver to control the brake is improved.

In the region in which the braking operation amount is high, the gain is set to be high (region (3) in FIG. 24), and the maximum deceleration of the vehicle 76 can be obtained easily and rapidly. In FIG. 24, the setting of the vehicle target braking force with respect to the braking operation amount is linear in each region. However, the setting may be non-linear, i.e., a curved characteristic and the connections of the respective regions may be made smooth.

Further, in a case in which the generation of vehicle deceleration is low with respect to the vehicle target braking force corresponding to the braking operation amount, the setting of the vehicle target braking force may be corrected in accordance with the carried load, as an increase in the weight of the vehicle can be contemplated (e.g., as in the case in which the vehicle 76 carries a load).

In step 106, the wheel speeds of the respective wheels 80 are computed by the wheel speed sensors 80. Then, in subsequent step 108, at the road surface μ slope estimating section 70, the value of the road surface μ slope for each wheel is, by the previously-described method, computed on the basis of the computed wheel speed of each wheel.

In following step 110, at the each wheel target braking force setting section 66, the target braking forces of the respective wheels 80 are distributed on the basis of the values of the road surface μ slopes of the respective wheels. This computation of the target braking amounts of the respective wheels will be described in further detail.

Figure 25:
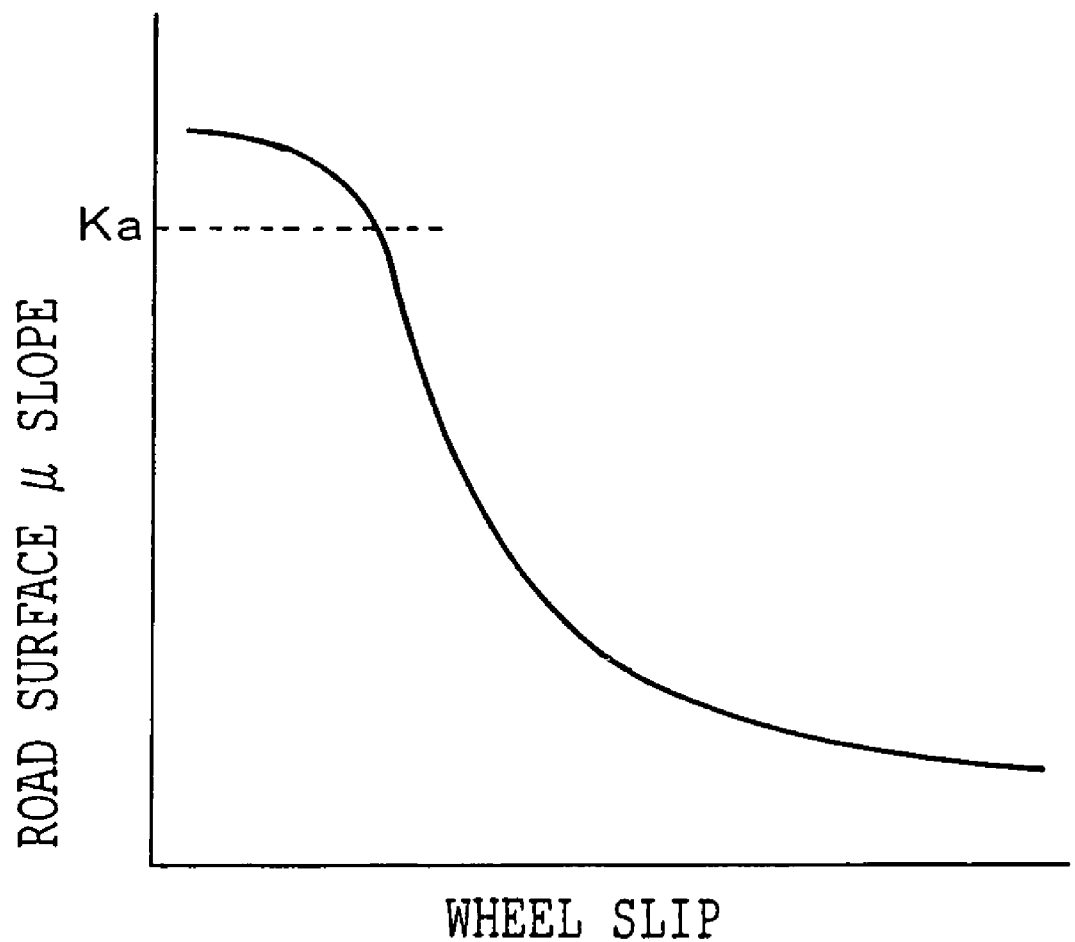
FIG. 25 is a graph showing a relationship between wheel slip and values of road surface μ slopes.

FIG. 25 shows values of the road surface μ slopes with respect to the vehicle slip. In the region in which the vehicle slip is small and the degree of grip of the tire is large, the change in the value of the road surface μ slope with respect to the change in the wheel slip is small. Accordingly, in such a region (i.e., in the case in which the value of the road surface μ slope is greater than a predetermined value Ka), the target braking force of each wheel is set by a preset distribution ratio. Then, when the value of the road surface μ slope of at least one of the wheels falls below the predetermined value Ka, the target braking forces corresponding to the values of the road surface μ slopes are distributed to the respective tires in the following manner.

First, the value of the road surface μ slope of the front left wheel is DL1, the value of the road surface μ slope of the front right wheel is DR1, the value of the road surface μ slope of the rear left wheel is DL2, and the value of the road surface μ slope of the rear right wheel is DR2. A reference road surface μ slope value D* is determined from these road surface μ slope values. The reference road surface μ slope value D* is determined as the average value of the values of the road surface μ slopes of the respective wheels, and is obtained by the following formula.

$$D^* = \frac{DL1 + DR1 + DL2 + DR2}{4} \quad (22)$$

As shown by the following formula, the reference road surface μ slope value D* may be set by weighting the road surface μ slope values DL1, DR1 of the front wheels and the road surface μ slope values DL2, DR2 of the rear wheels with weighting factors W1, W2.

$$D^* = W1 \cdot (DL1 + DR1) + W2 \cdot (DL2 + DR2) \quad (23)$$

Moreover, as shown by the following formula, when the vehicle 76 is turning, the reference road surface μ slope value D* may be set by applying weighting factors WL1, WR1, WL2, WR3 to the road surface μ lope values of the respective wheels in accordance with the state of the vehicle turning.

$$D^* = WL1 \cdot DL1 + WR1 \cdot DR1 + WL2 \cdot DL2 + WR2 \cdot DR2 \quad (24)$$

On the basis of the reference road surface μ slope value D* determined in this way, a target braking force BFL1* of the front left wheel, a target braking force BFR1* of the front right wheel, a target braking force BFL2* of the rear left wheel, and a target braking force BFR2* of the rear right wheel are determined by the following formulas.

$$BFL1^* = BF^* \cdot \frac{DL1}{D^*} \quad (25)$$

$$BFR1^* = BF^* \cdot \frac{DR1}{D^*} \quad (26)$$

$$BFL2^* = BF^* \cdot \frac{DL2}{D^*} \quad (27)$$

$$BFR2^* = BF^* \cdot \frac{DR2}{D^*} \quad (28)$$

Namely, in a case in which the value of the road surface μ slope is large, a large braking force is applied, and in the case in chi the value of the road surface μ slope is small, a small braking force is applied. In this way, a situation in which an excessive braking force is applied to a wheel with a low road surface μ and the wheel slips can be prevented.

For example, the target braking force of each wheel can be set by using weighting factors W3, W4 (W3>W4) as in the following formula, such that the braking force distribution ratio of the front wheels is slightly larger than that of the rear wheels.

$$BFL1^* = BF^* \cdot \frac{W3 \cdot DL1}{D^*} \quad (29)$$

$$BFR1^* = BF^* \cdot \frac{W3 \cdot DR1}{D^*} \quad (30)$$

$$BFL2^* = BF^* \cdot \frac{W4 \cdot DL2}{D^*} \quad (31)$$

$$BFR2^* = BF^* \cdot \frac{W4 \cdot DR2}{D^*} \quad (32)$$

In a case in which the turning state is large and stability is required, the target braking forces of the front wheels are increased and the target braking forces of the rear wheels are reduced as shown by the following formulas.

$$BFL1^* = BF^* \cdot \frac{DL1}{D^*} + \Delta BFL1 \quad (33)$$

$$BFR1^* = BF^* \cdot \frac{DR1}{D^*} + \Delta BFR1 \quad (34)$$

$$BFL2^* = BF^* \cdot \frac{DL2}{D^*} - \Delta BFL2 \quad (35)$$

$$BFR2^* = BF^* \cdot \frac{DR2}{D^*} - \Delta BFR2 \quad (36)$$

Here, ΔBFL1, ΔBFR1, ΔBFL2, ΔBFR2 are target braking force correction amounts. By setting the target braking forces of the respective wheels in this way, the stability of the vehicle can be ensured without reducing the total braking force of the vehicle. Further, the target braking forces of the respective wheels may be corrected in the left and right direction. For example, as shown in the following formulas, when the vehicle 76 turns left, correction is carried out such that the target braking forces of the turning outer side wheels, i.e., the right side wheels, are large, and correction is carried out such that the target braking forces of the inner side wheels, i.e., the left side wheels, are small.

$$BFLI^* = BF^* \cdot \frac{DL1}{D^*} - \Delta BFL1 \qquad (37)$$

$$BFR1^* = BF^* \cdot \frac{DR1}{D^*} + \Delta BFR1 \qquad (38)$$

$$BFL2^* = BF^* \cdot \frac{DL2}{D^*} - \Delta BFL2 \qquad (39)$$

$$BFR2^* = BF^* \cdot \frac{DR2}{D^*} + \Delta BFR2 \qquad (40)$$

The turning state is obtained from the difference in the left and right wheel speeds, and from the output of at least one sensor among a steering angle sensor, a yaw rate sensor, and a lateral acceleration sensor. Further, the target braking force correction amounts ΔBFL1, ΔBFR1, ΔBFL2, ΔBFR2 are preferably set in accordance with the degree of the turning state.

Further, in a case in which the steering angle of the driver is fast and a sudden turn is required, or in a case in which the vehicle swells toward the turning outer side (so-called understeering) and the driver wishes to make the turning radius smaller, as shown by the following formulas, the target braking forces of the front wheels are set small such that the steerability is improved, and the target braking forces of the rear wheels are set high in order for the vehicle deceleration to not deteriorate.

$$BFL1^* = BF^* \cdot \frac{DL1}{D^*} - \Delta BFL1 \qquad (41)$$

$$BFR1^* = BF^* \cdot \frac{DR1}{D^*} - \Delta BFR1 \qquad (42)$$

$$BFL2^* = BF^* \cdot \frac{DL2}{D^*} + \Delta BFL2 \qquad (43)$$

$$BFR2^* = BF^* \cdot \frac{DR2}{D^*} + \Delta BFR2 \qquad (44)$$

Further, the target braking forces of the respective wheels may be corrected in the left and right direction. For example, in the case of a left turn, as shown by the following formulas, correction is carried out such that the target braking forces of the turning outer side wheels, i.e., the right side wheels, are set low, and the target braking forces of the inner side wheels, i.e., the left side wheels, are large.

$$BFL1^* = BF^* \cdot \frac{DL1}{D^*} + \Delta BFL1 \qquad (45)$$

$$BFR1^* = BF^* \cdot \frac{DR1}{D^*} - \Delta BFR1 \qquad (46)$$

$$BFL2^* = BF^* \cdot \frac{DL2}{D^*} + \Delta BFL2 \qquad (47)$$

$$BFR2^* = BF^* \cdot \frac{DR2}{D^*} - \Delta BFR2 \qquad (48)$$

Here, the target braking force correction amounts ΔBFL1, ΔBFR1, ΔBFL2, ΔBFR2 are preferably set in accordance with the steering state of the driver and the degree of the vehicle turning state.

In step 112, braking of the respective wheels is controlled by the fluid pressure control means (braking force control means) 72, on the basis of the target braking forces of the respective wheels computed as described above.

In this way, the target braking forces of the respective wheels are distributed in consideration also of the friction state between the road surface and the tire (i.e., the road surface μ). Thus, for example, even if a wheel having a large load is on a low μ road surface, a situation in which an excessive braking force is distributed to the wheel and the wheel slips can be avoided, and the vehicle can be made to brake appropriately.

In the above description, a case is described in which the present invention is applied to a vehicle 76 using an electro-hydraulic brake system. However, the present invention may be applied to a vehicle using an electromechanical brake system (EMB). In an EMB, as shown in FIG. 26, the wheel brakes 82 are controlled without using fluid pressure. For example, the vehicle 76 is made to brake by a friction material being pushed against the brake disc 84 or against a brake drum by a braking torque applying means 96 which is formed from a combination of a motor and a rotation—rectilinear motion conversion mechanism.

What is claimed is:

1. A braking force distribution control device comprising:
    wheel speed detecting means for detecting wheel speeds of respective wheels of a vehicle;
    road surface μ slope estimating means for, on the basis of the detected wheel speeds, estimating for the respective wheels slopes of a coefficient of friction μ between the wheels and a road surface as road surface μ slopes;
    control means for, on the basis of the road surface μ slopes estimated for the respective wheels by the road surface μ slope estimating means, distributing braking forces to the respective wheels by controlling the braking force of each wheel; and
    wherein on the basis of the detected wheel speeds, the road surface μ slope estimating means estimates slopes of braking forces with respect to wheel slip speeds as the road surface μ slopes for the respective wheels, and the control means determines a relationship between the road surface μ slope of a wheel which is an object of control and the road surface μ slope of a reference wheel, and controls a braking torque of the wheel which is the object of control taking into account said relationship.

2. A braking force distribution control device according to claim 1, wherein in a case in which a front wheel is the reference wheel and a rear wheel is the wheel which is the object of control, when a variation between the road surface μ slope of the front wheel and the road surface μ slope of the rear wheel is greater than a first predetermined value, the control means increases the braking torque of the rear wheel, and when the variation is less than a second predetermined value, the control means reduces the braking torque of the rear wheel.

3. A braking force distribution control device according to claim 2, wherein the control means carries out select-low control in accordance with, among the two rear wheels, the wheel which has the lower road surface μ slope or the wheel which has the lower braking torque.

4. A braking force distribution control device according to claim 1, wherein in a case in which a rear wheel is the reference wheel and a front wheel is the wheel which is the object of control, when a variation between the road surface μ slope of the front wheel and the road surface μ slope of the rear wheel is greater than a first predetermined value, the control means increases the braking torque of the front wheel, and when the variation is less than a second predetermined value, the control means reduces the braking torque of the front wheel.

5. A braking force slope distribution device according to claim 1, wherein in a case in which a turning inner side wheel is the reference wheel and a turning outer side wheel is the wheel which is the object of control, when a variation between the road surface μ slope of the turning inner side wheel and the road surface μ slope of the turning outer side wheel is greater than or a first predetermined value, the control means increases the braking torque of the turning outer side wheel, and when the variation is less than a second predetermined value, the control means reduces the braking torque of the turning outer side wheel.

6. A braking force distribution control device according to claim 1, wherein in a case in which a turning outer side wheel is the reference wheel and a turning inner side wheel is the wheel which is the object of control, when a variation between the road surface μ slope of the turning outer side wheel and the road surface μ slope of the turning inner side wheel is greater than a first predetermined value, the control means increases the braking torque of the turning inner side wheel, and when the variation is less than a second predetermined value, the control means reduces the braking torque of the turning inner side wheel.

7. A braking force distribution control device according to claim 1, wherein the control means controls the braking torque by using one of a turning inner side front wheel, a turning outer side front wheel, a turning inner side rear wheel, and a turning outer side rear wheel as the reference wheel, and using at least one other wheel as the wheel which is the object of control.

8. A braking force distribution control device comprising:
wheel speed detecting means for detecting wheel speeds of respective wheels of a vehicle;
road surface μ slope estimating means for, on the basis of the detected wheel speeds, estimating for the respective wheels slopes of a coefficient of friction μ between the wheels and a road surface as road surface μ slopes;
control means for, on the basis of the road surface μ slopes estimated for the respective wheels by the road surface μ slope estimating means, distributing braking forces to the respective wheels by controlling the braking force of each wheel; and
wherein on the basis of the detected wheel speeds, the road surface μ slope estimating means estimates slopes of braking forces with respect to wheel slip speeds as the road surface μ slopes for the respective wheels, and the control means controls a braking torque of a wheel which is an object of control by taking into account a difference between the road surface μ slope of the wheel which is the object of control and the road surface μ slope of a reference wheel among the road surface μ slopes estimated by the road surface μ slope estimating means.

9. A braking force distribution control device according to claim 8, wherein in a case in which a front wheel is the reference wheel and a rear wheel is the wheel which is the object of control, when the difference between the road surface μ slope of the front wheel and the road surface μ slope of the rear wheel is greater than a first predetermined value, the control means increases the braking torque of the rear wheel, and when the difference is less than a second predetermined value, the control means reduces the braking torque of the rear wheel.

10. A braking force distribution control device according to claim 9, wherein the control means carries out select-low control in accordance with, among the two rear wheels, the wheel which has the lower road surface μ slope or the wheel which has the lower braking torque.

11. A braking force distribution control device according to claim 8, wherein in a case in which a rear wheel is the reference wheel and a front wheel is the wheel which is the object of control, when the difference between the road surface μ slope of the front wheel and the road surface μ slope of the rear wheel is greater than a first predetermined value, the control means increases the braking torque of the front wheel, and when the difference is less than a second predetermined value, the control means reduces the braking torque of the front wheel.

12. A braking force slope distribution device according to claim 8, wherein in a case in which a turning inner side wheel is the reference wheel and a turning outer side wheel is the wheel which is the object of control, when the difference between the road surface μ slope of the turning inner side wheel and the road surface μ slope of the turning outer side wheel is greater than or a first predetermined value, the control means-increases the braking torque of the turning outer side wheel, and when the difference is less than a second predetermined value, the control means reduces the braking torque of the turning outer side wheel.

13. A braking force distribution control device according to claim 8, wherein in a case in which a turning outer side wheel is the reference wheel and a turning inner side wheel is the wheel which is the object of control, when the difference between the road surface μ slope of the turning outer side wheel and the road surface μ slope of the turning inner side wheel is greater than first predetermined value, the control means increases the braking torque of the turning inner side wheel, and when the difference is less than a second predetermined value, the control means reduces the braking torque of the turning inner side wheel.

* * * * *